United States Patent
Kim et al.

(10) Patent No.: US 11,323,640 B2
(45) Date of Patent: May 3, 2022

(54) TETRACELL IMAGE SENSOR PREFORMING BINNING

(71) Applicant: SAMSUNG ELECTRONICS CO., LTD., Suwon-si (KR)

(72) Inventors: Moo Young Kim, Suwon-si (KR); Minho Kwon, Suwon-si (KR); Dongki Min, Suwon-si (KR); Seonghye Park, Suwon-si (KR); Eunjik Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/815,186

(22) Filed: Mar. 11, 2020

(65) Prior Publication Data

US 2020/0314364 A1 Oct. 1, 2020

(30) Foreign Application Priority Data

Mar. 26, 2019 (KR) .......................... 10-2019-0034580

(51) Int. Cl.
    *H04N 5/225* (2006.01)
    *H04N 5/347* (2011.01)
    *H04N 9/04* (2006.01)

(52) U.S. Cl.
    CPC ......... *H04N 5/347* (2013.01); *H04N 9/04511* (2018.08)

(58) Field of Classification Search
    CPC .. H04N 5/347; H04N 5/3745; H04N 5/37455; H04N 5/37457
    See application file for complete search history.

(56) References Cited

U.S. PATENT DOCUMENTS

| | | | |
|---|---|---|---|
| 7,091,466 B2 | 8/2006 | Bock | |
| 7,502,505 B2 | 3/2009 | Malvar et al. | |
| 7,745,779 B2 | 6/2010 | Conners | |
| 7,773,138 B2 | 8/2010 | Lahav et al. | |
| 7,929,807 B2 | 4/2011 | Andersen | |
| 9,584,742 B2 | 2/2017 | Park et al. | |
| 10,334,189 B1* | 6/2019 | Xu | H04N 9/045 |
| 2007/0133893 A1 | 6/2007 | Jerdev | |
| 2008/0001067 A1* | 1/2008 | Asaba | H04N 5/343 250/208.1 |
| 2008/0303930 A1* | 12/2008 | Kuroda | H01L 27/14636 348/308 |

(Continued)

*Primary Examiner* — Jason A Flohre
*Assistant Examiner* — Dwight Alex C Tejano
(74) *Attorney, Agent, or Firm* — F. Chau & Associates, LLC

(57) ABSTRACT

Systems and methods are described for a tetracell image sensor that performs diamond binning to process image data. An image sensor includes a pixel array and a converting circuit, where the pixel array includes pixel sets arranged in a row direction and a column direction, outputs a first signal generated from a first pixel set of the pixel sets, and outputs a second signal generated from a second pixel set of the pixel sets. The converting circuit performs binning based on the first signal and the second signal to generate a first binning signal. Each of the first pixel set and the second pixel set includes pixel sensors adjacent to each other, and the first pixel set and the second pixel set are located at different rows and different columns.

16 Claims, 16 Drawing Sheets

(56) References Cited

U.S. PATENT DOCUMENTS

| | | | |
|---|---|---|---|
| 2010/0053397 A1* | 3/2010 | Yanai | H04N 5/3575 348/301 |
| 2010/0149393 A1 | 6/2010 | Zarnowski et al. | |
| 2010/0302407 A1* | 12/2010 | Ayers | H04N 5/37455 348/230.1 |
| 2011/0273597 A1* | 11/2011 | Ishiwata | H04N 5/357 348/272 |
| 2012/0025060 A1* | 2/2012 | Iwata | H04N 5/379 250/208.1 |
| 2012/0113290 A1* | 5/2012 | Nakata | H01L 27/14636 348/222.1 |
| 2013/0002919 A1* | 1/2013 | Tajima | H04N 5/353 348/311 |
| 2013/0075588 A1* | 3/2013 | Kawaguchi | H04N 9/045 250/208.1 |
| 2015/0172579 A1* | 6/2015 | Manabe | H01L 27/14641 250/208.1 |
| 2015/0312537 A1* | 10/2015 | Solhusvik | H04N 9/04559 348/302 |
| 2016/0182842 A1* | 6/2016 | Mabuchi | H04N 5/37457 348/308 |
| 2017/0171470 A1* | 6/2017 | Sakioka | H01L 27/14623 |
| 2018/0146148 A1* | 5/2018 | Kaneko | H04N 5/341 |
| 2018/0152631 A1* | 5/2018 | Wei | H04N 5/341 |
| 2018/0191974 A1* | 7/2018 | Shim | H04N 5/37457 |
| 2018/0204867 A1* | 7/2018 | Kim | H01L 24/80 |

\* cited by examiner

TETRACELL IMAGE SENSOR PREFORMING BINNING

CROSS-REFERENCE TO RELATED APPLICATIONS

This application claims priority under 35 U.S.C. § 119 to Korean Patent Application No. 10-2019-0034580 filed on Mar. 26, 2019, in the Korean Intellectual Property Office, which is incorporated by reference herein in its entirety.

BACKGROUND

Embodiments of the inventive concept disclosed herein relate to an image sensor, and more particularly, to an image sensor that performs binning.

Image sensors convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

As semiconductor technology develops, the resolution of image sensors increases, leading to an increase in the amount of data that the image sensors generate. Consequentially, demand is increasing for binning technologies that reduce the amount of image data.

SUMMARY

Embodiments of the inventive concept provide a tetracell image sensor that performs diamond binning for the purpose of processing image data.

According to an exemplary embodiment, an image sensor may include a pixel array and a converting circuit. The pixel array may include pixel sets arranged in a row direction and a column direction, may output a first signal generated from a first pixel set of the pixel sets, and may output a second signal generated from a second pixel set of the pixel sets. The converting circuit may perform binning based on the first signal and the second signal to generate a first binning signal. Each of the first pixel set and the second pixel set may include pixel sensors adjacent to each other, and the first pixel set, and the second pixel set may be located at different rows and different columns.

According to an exemplary embodiment, an image sensor may include a pixel array and a converting circuit. The pixel array may output a first signal generated from a first pixel set and a second signal generated from a second pixel set located in a first diagonal direction from the first pixel set. The converting circuit may perform analog binning on the first signal and the second signal to generate a first binning signal and may perform digital conversion based on the first binning signal. Each of the first pixel set and the second pixel set may include pixel sensors adjacent to each other.

According to an exemplary embodiment, an image sensor may include a pixel array and a converting circuit. The pixel array may output signals generated from pixel sets each including pixels adjacent to each other. The converting circuit may perform binning and digital conversion on the signals to generate a first digital signal. The pixel sets may include a first pixel set, a second pixel set, and a third pixel set. When the second pixel set and the third pixel set are the two pixel sets which are the closest to the first pixel set from among the pixel sets, rows and column at which the second pixel set and the third pixel set may be located are different from a row and a column at which the first pixel set is located.

According to an exemplary embodiment, an image sensor may comprising a pixel array including a plurality of pixel sets arranged in a row direction and a column direction, wherein each of the plurality of pixel sets includes a plurality of adjacent pixel sensors having a same color; a first group of four pixel sets having a first color, wherein the first group of four pixel sets is arranged in a first diamond pattern occupying three columns and three rows; and a converting circuit configured to perform binning based at least in part on a first signal received from the first group of four pixel sets.

The image sensor of claim may also include a second group of four pixel sets having a second color, wherein the second group of four pixel sets is arranged in a second diamond pattern occupying two rows and two columns, and wherein the converting circuit is configured to perform the binning based at least in part on a second signal received from the second group of four pixel sets.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

The present disclosure describes a binning technology that can reduce the amount of data in an image signal. For example, at least one of embodiments includes a diamond binning technology used in a tetracell image sensor. A tetracell image sensor may be used to provide a bright image under a low level light. The tetracell image sensor may comprise a structure in which pixels using the same color filter are continuously arranged. Embodiments of the inventive concept may prevent the image quality from decreasing in an electronic device including a tetracell image sensor.

Embodiments of the inventive concept are described in detail herein to such an extent that those with ordinary skill in the art may easily implement the inventive concept.

The term "tetracell" as used herein refers to a color filter array (CFA) that includes multiple contiguous pixel sensors having a same color. For example, pixel sensors may be arranged in groups of four. A CFA is a pattern of color filters placed on the pixel sensors of an image sensor to capture color information.

The term "binning" as used herein refers to an operation performed on signals to reduce the amount of information included in signals or the size of data that signals indicate. Binning may be classified as analog binning or digital binning.

The analog binning may refer to an operation performed on analog signals. When a first signal is generated as a result of performing the analog binning on analog signals, a voltage level of the first signal may be smaller than a sum of voltage levels of the analog signals. For example, the voltage level of the first signal may be an average of voltage levels of analog signals. For another example, the voltage level of the first signal may be an arithmetic average of voltage levels of analog signals.

The digital binning may refer to an operation performed on digital signals. When a second signal is generated as a result of performing the digital binning on digital signals, the number of bits included in the second signal may be smaller than the total number of bits included in the digital signals. For example, the second signal may be generated by removing some of bits included in digital signals.

Figure 1:
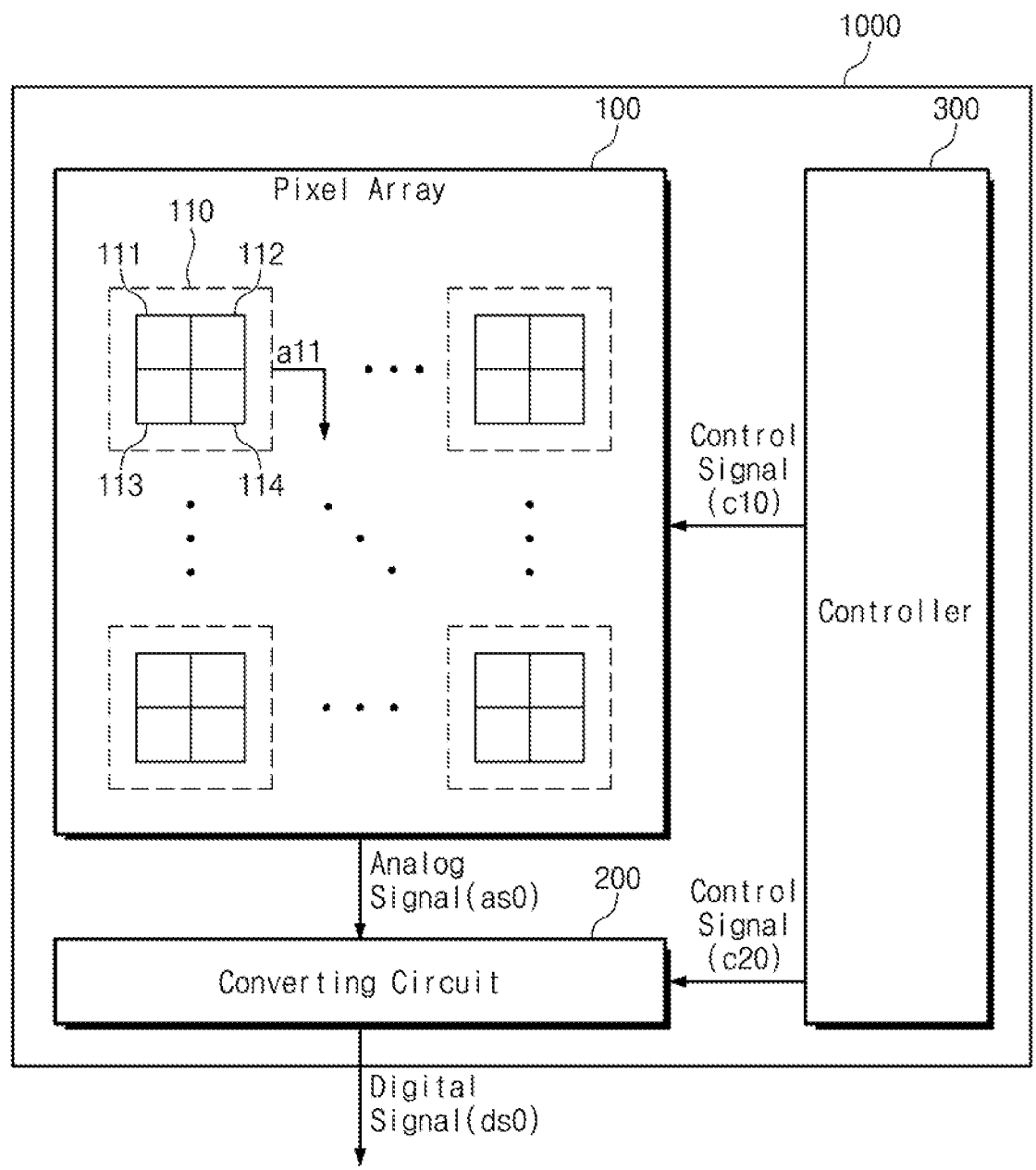
FIG. 1 is a block diagram illustrating an image sensor according to an embodiment of the inventive concept.

FIG. 1 is a block diagram illustrating an image sensor according to an embodiment of the inventive concept.

An image sensor 1000 may receive a light from an outside source and may generate a digital signal. An electronic device including the image sensor 1000 may display an image in a display panel based on the digital signal. For example, an electronic device that includes an image sensor may be implemented with one of various types of electronic devices such as a smartphone, a tablet personal computer (PC), a laptop PC, and a wearable device.

The image sensor 1000 may include a pixel array 100, a converting circuit 200, and a controller 300.

The controller 300 may control the pixel array 100 and the converting circuit 200. For example, the controller 300 may output a control signal c10 to the pixel array 100. The pixel array 100 may output an analog signal as0 to the converting circuit 200, based on the control signal c10. The analog signal as0 may include information about a light incident on the pixel array 100. The controller 300 may output a control signal c20 to the converting circuit 200. The converting circuit 200 may process the analog signal as0 based on the control signal c20 and may generate a digital signal ds0. For example, based on the control signal c20, the converting circuit 200 may perform binning on the analog signal as0 and may then generate the digital signal ds0 as a binning result. For another example, based on the control signal c20, the converting circuit 200 may convert the analog signal as0 into a digital signal and may then perform binning on the digital signal.

The pixel array 100 may include pixels (e.g., 111, 112, 113, and 114). In the following descriptions, the term "pixels" means "pixel sensors". Each of the pixels (e.g., 111 to 114) may receive a light from the outside. Each of the pixels (e.g., 111 to 114) may store information about the received light. Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. A level of a voltage output from a photodiode may be proportional to the amount of charges output from the photodiode. That is, a level of a voltage output from a photodiode may be proportional to the amount of light received by the photodiode.

The pixel array 100 according to an embodiment of the inventive concept may operate in the unit of a pixel set (e.g., 110). The pixel set 110 may include the pixels 111, 112, 113, and 114. The pixel set 110 will be described in detail with reference to FIG. 2. The pixel set 110 may output an analog signal a11 based on a light received by the pixels 111, 112, 113, and 114 included in the pixel set 110. The analog signal a11 may be a voltage output from the pixel set 110. A level of the voltage output from the pixel set 110 may be a total sum of levels of voltages respectively output from the pixels 111, 112, 113, and 114.

The pixel array 100 may include pixel sets (e.g., 110) and may output analog signals from the selected pixel sets. Each of the pixel sets (e.g., 110) may output an analog signal. The image sensor 1000 may select some of the pixel sets (e.g., 110) based on the control signal c10. The analog signal as0 may be a set of analog signals output from the selected pixel sets. The converting circuit 200 may perform binning based on the analog signals output from the selected pixel sets. In the following descriptions, pixel sets targeted for binning may be expressed by binning pixel sets.

The converting circuit 200 may receive the analog signal as0 and may perform binning and digital conversion on the analog signal as0, based on the control signal c20. For example, the order of binning and digital conversion that are performed in the converting circuit 200 may be determined by the control signal c20. For another example, the converting circuit 200 may perform binning and digital conversion in a given order regardless of the control signal c20. An operation of the converting circuit 200 will be described in detail with reference to FIGS. 5 to 15.

The converting circuit 200 may perform binning and digital conversion on the analog signal as0 to output the digital signal ds0. The digital signal ds0 may include information about a light received by pixels. The analog signal as0 may indicate a value that continuously varies with a change in time. In contrast, the digital signal ds0 may indicate a value that discontinuously varies with a change in time. For example, the digital signal ds0 may be composed of voltages each indicating a value of logic "0" or a value of logic "1".

An electronic device including the image sensor 1000 may process the digital signal ds0 and may display an image in a display panel. As the size of data included in the digital signal ds0 increases, the size of data to be processed by an electronic device may increase. An increase in the size of data to be processed by an electronic device means an increase in the workload of the electronic device. When the workload of the electronic device increases, power consumption of the electronic device may increase. Also, when the workload of the electronic device increases, a speed at which the electronic device processes data may become slower.

In the following descriptions, the image sensor 1000 may be a tetracell image sensor having a tetracell structure. The tetracell structure will be described in detail with reference to FIG. 2. The number of pixels included in the pixel array 100 having the tetracell structure may be greater than the number of pixels included in a pixel array. In the case where binning is not performed, the size of data included in the digital signal ds0 may be proportional to the number of pixels included in the pixel array 100. According to an embodiment of the inventive concept, the image sensor 1000 may perform binning to appropriately reduce the size of data included in the digital signal ds0. For example, the size of data included in the digital signal ds0 generated as a result of performing binning may be smaller than the size of data included in a digital signal generated without performing binning. Also, the image sensor 1000 may perform diamond binning, thus reducing noise occurring in the process of performing binning. The diamond binning will be described in detail with reference to FIGS. 2 and 3.

Figure 2:
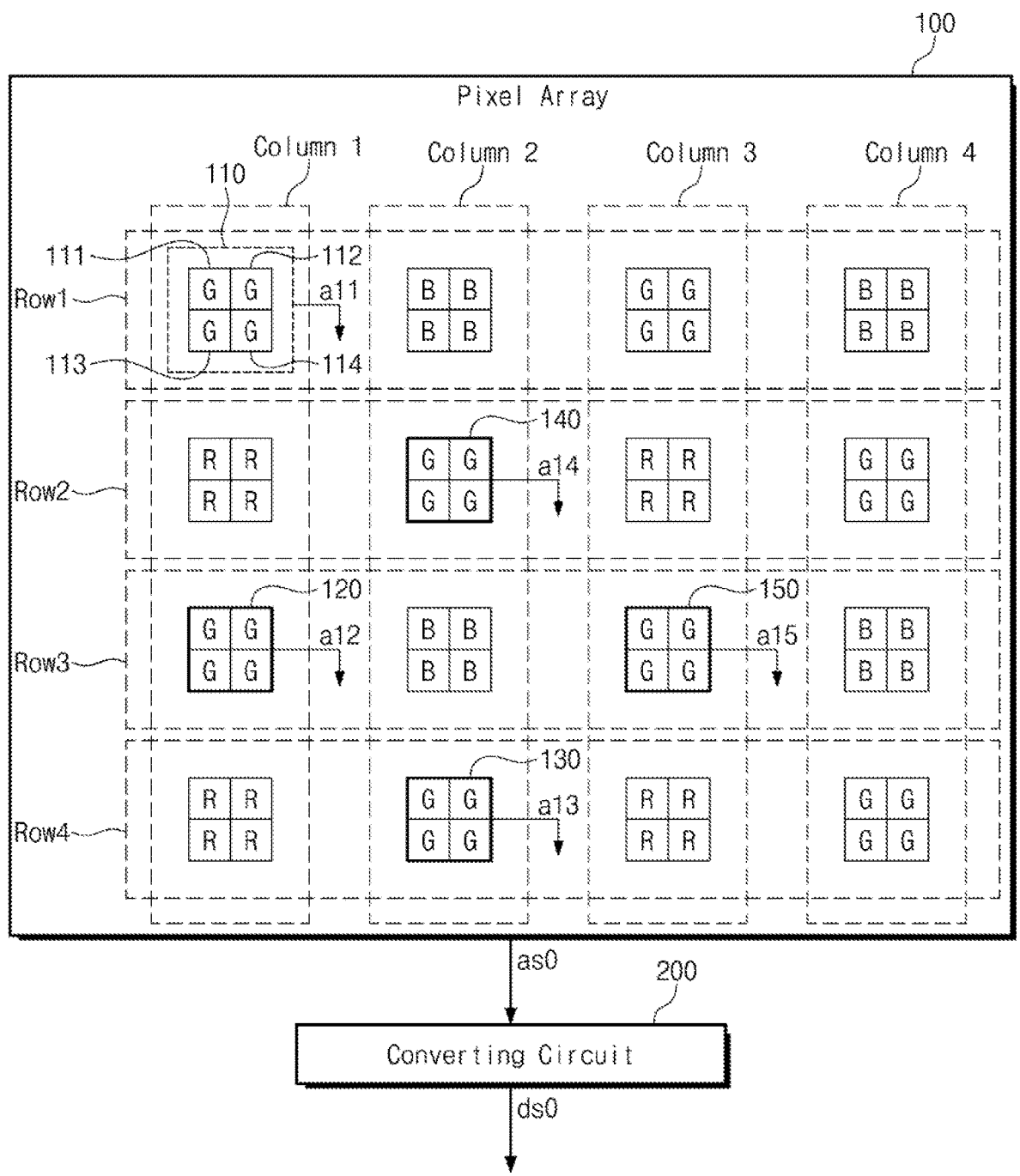
FIG. 2 is a block diagram for describing a method of selecting binning pixel sets according to an embodiment of the inventive concept.

FIG. 2 is a block diagram for describing a method of selecting binning pixel sets according to an embodiment of the inventive concept. In the following descriptions, it is assumed that the pixel array 100 is a pixel array having a tetracell structure.

In some cases, pixels having different color filters may be alternately arranged so that pixels having a same color are not contiguous. In contrast, in a pixel array 100 having the tetracell structure, pixels having the same color filter may be continuously arranged. For example, pixels (e.g., 111, 112, 113, and 114) having the same color filter may be arranged in an M*N matrix (M and N being an integer of 2 or more). In the following descriptions, pixels having a green filter, pixels having a blue filter, and pixels having a red filter are expressed as G pixels, B pixels, and R pixels, respectively.

In the M*N matrix, "M" pixel lines may be arranged in a vertical direction. Each of the "M" pixel lines may include "N" pixels that are continuously arranged in a horizontal direction. In the following descriptions, it is assumed that "M" and "N" are 2, but the inventive concept is not limited thereto. For example, "M" and "N" may be 3. Also, "M" and "N" may be different integers.

The pixel array 100 may be arranged according to units referred to as pixel sets (e.g., pixel set 110). A pixel set 110 may be a set of pixels with a same color filter that are arranged in an M*N matrix. For example, the pixel set 110 may be a set of G pixels 111, 112, 113, and 114 arranged in a 2*2 matrix. In the following descriptions, pixel sets including G pixels, pixel sets including B pixel, and pixel sets including R pixels are referred to as G pixel sets, B pixel sets, and R pixel sets, respectively. In the pixel array 100, pixel sets having different color filters may be alternately arranged (i.e., pixel sets having the same color are not contiguous).

Pixel sets may be arranged to form a pattern in which there are alternately arranged rows (e.g., a first row and a third row) where the G pixel set and the B pixel set are alternately arranged and a row (e.g., a second row and a fourth row) where the R pixel set and the G pixel set are alternately arranged. Rows may be areas that are defined by dividing an area of the pixel array 100 in the horizontal direction. Columns may be areas that are defined by dividing the area of the pixel array 100 in the vertical direction.

The image sensor 1000 described with reference to FIG. 1, including the pixel array 100, may operate in a tetra mode or a normal mode. When an external environment has low-level light, the image sensor 1000 may operate in the tetra mode. A low-level light environment may include an indoor environment or a night environment, or any environment where the quantity of light is relatively low.

When an external environment has a normal level light, the image sensor 1000 may operate in the normal mode. The quantity of light in a normal level light environment may be greater than the quantity of light in the low-level light environment. However, the inventive concept is not limited thereto. For example, the image sensor 1000 may operate in one or more modes different from the tetra mode and the normal mode.

In the normal mode, the pixel array 100 may output an analog signal from each of the pixels 111, 112, 113, and 114. Due to the large number of analog signals to be output; the shape, light, shade, etc. of an external environment may be clearly displayed in a display panel in the normal mode.

The quantity of light received by a pixel (e.g., 111) in the low-level light environment may be smaller than the quantity of light received by a pixel (e.g., 111) in the normal level light environment. Accordingly, when the image sensor 1000 operates in the tetra mode, the pixel array 100 may output an analog signal (e.g., a11) from a pixel set (e.g., 110) instead of outputting an analog signal from individual pixels (e.g., 111 to 114). The quantity of light received by the pixel set 110 may be a total sum of the quantities of lights respectively received by pixels (e.g., 111 to 114). Accordingly, an analog signal (e.g., a11) output in the tetra mode may include enough information to properly display a color of the external environment in the display panel in the tetra mode.

In the following description, it is sometimes assumed that the image sensor 1000 is operating in the tetra mode. Thus, the image sensor 1000 may perform binning and digital conversion on an analog signal (e.g., as0) output from the pixel array 100. The image sensor 1000 may select binning pixel sets 120, 130, 140, and 150. The binning pixel sets 120 to 150 may output analog signals a12, a13, a14, and a15. The analog signal as0 may be a set of the analog signals a12 to a15 output from the binning pixel sets 120 to 150. The converting circuit 200 may perform binning on the analog signals a12 to a15 in various manners. Methods by which the converting circuit 200 may perform binning will be described with reference to FIGS. 5 to 15.

For binning, the image sensor 1000 may select the binning pixel sets 120 to 150 having a filter of the same color. The binning pixel sets 120 to 150 may have a G filter. The image sensor 1000 may select the binning pixel sets 120 to 150 having the G filter in a first diamond manner. The image sensor 1000 may select binning pixel sets having the R filter or the B filter in a second diamond manner different from the first diamond manner. The second diamond manner will be described in detail with reference to FIG. 3.

The binning pixel set 120 may be adjacent to the binning pixel sets 130 and 140. The binning pixel sets 130 and 140 next to the binning pixel set 120 may be two binning pixel sets 130 and 140 which are the closest to the binning pixel set 120, from among the binning pixel sets 120 to 150.

A row and a column where the binning pixel set 120 are located may be different from rows and columns where the binning pixel sets 130 and 140 are located. For example, the binning pixel set 120 may be present in a first column, and the binning pixel sets 130 and 140 may be present in a second column different from the first column. The binning pixel set 120 may be present in a third row, and the binning pixel sets 130 and 140 may be present in a fourth row and a second row different from the third row.

Also, the binning pixel sets 130 and 140 may be located in a diagonal direction from the binning pixel set 120. The diagonal direction may mean a direction that is oblique with respect to a horizontal direction or a vertical direction. That the binning pixel sets 130 and 140 are located in the diagonal direction from the binning pixel set 120 may mean that rows and columns where the binning pixel sets 130 and 140 are located are different from a row and a column where the binning pixel set 120 are located.

A relationship between the binning pixel set 120 and the binning pixel sets 130 and 140 may be applied between a given binning pixel set of the binning pixel sets 120 to 150 and binning pixel sets next to the given binning pixel set. Also, an example is illustrated in FIG. 2 as the binning pixel sets 120 to 150 are selected from pixel sets included in the pixel array 100, but the inventive concept is not limited thereto. A pixel set located at the first row and third column may be selected instead of the pixel set 140, and a pixel set located at the second row and fourth column may be selected instead of the pixel set 150.

The converting circuit 200 may receive the analog signals a12 to a15. The converting circuit 200 may perform binning and digital conversion on the analog signals a12 to a15 to output the digital signal ds0. The digital signal ds0 may include information about a position corresponding to the center of gravity of an area defined by connecting the binning pixel sets 120 to 150. The area defined by connecting the binning pixel sets 120 to 150 may be a diamond shape.

Thus, according to an exemplary embodiment the image sensor 1000 may comprising a pixel array 100 including a plurality of pixel sets arranged in a row direction and a column direction, wherein each of the plurality of pixel sets includes a plurality of adjacent pixel sensors having a same color; a first group of four pixel sets having a first color (e.g., a green color), wherein the first group of four pixel sets (e.g., pixel sets 120, 130, 140 and 150) is arranged in a first diamond pattern occupying three columns (Column 1 through Column 3) and three rows (e.g., Row 2 through Row 4); and a converting circuit 200 configured to perform binning based at least in part on a first signal received from the first group of four pixel sets.

Figure 3:
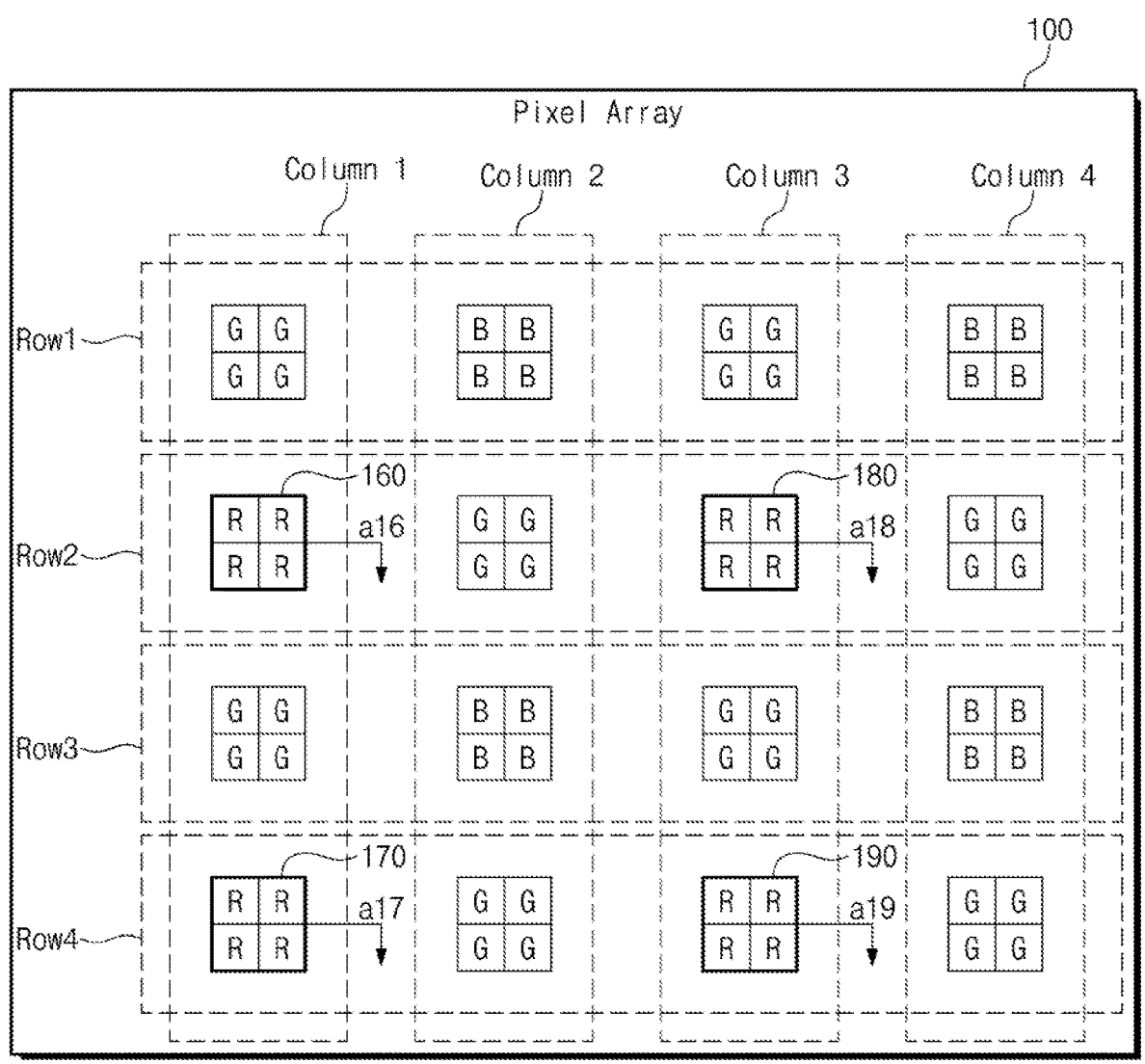
FIG. 3 is a block diagram for describing a method of selecting binning pixel sets according to an embodiment of the inventive concept.

FIG. 3 is a block diagram for describing a method of selecting binning pixel sets according to an embodiment of the inventive concept.

For binning, the image sensor 1000 (described with reference to FIG. 1) may select binning pixel sets (e.g., 160, 170, 180, and 190) having a filter of the same color. The image sensor 1000 may select binning pixel sets having the R filter in the second diamond manner. Also, the image sensor 1000 may select binning pixel sets having the B filter in the second diamond manner. Below, a method in which the image sensor 1000 selects binning pixel sets 160, 170, 180, and 190 having the R filter in the second diamond manner will be described. A way to select binning pixel sets having the B filter may be substantially the same as the way to select binning pixel sets having the R filter, and thus, a method of selecting the binning pixel sets having the B filter will be omitted to avoid redundancy. The binning pixel sets 160 to 190 may output analog signals a16, a17, a18, and a19.

The binning pixel set 160 may be next to the binning pixel sets 170 and 180. The binning pixel sets 170 and 180 next to the binning pixel set 160 may be two binning pixel sets 170 and 180 which are the closest to the binning pixel set 160, from among the binning pixel sets 160 to 190.

One binning pixel set 180 of the binning pixel sets 170 and 180 and the binning pixel set 160 may be located at the same row. When the binning pixel set 180 and the binning pixel set 160 are located at the same row, the binning pixel set 180 and the binning pixel set 160 may be located at different columns. When one binning pixel set 180 of the binning pixel sets 170 and 180 is located at the same row as the binning pixel set 160, the other binning pixel set 170 of the binning pixel sets 170 and 180 and the binning pixel set 160 may be located at different rows. When the binning pixel set 170 and the binning pixel set 160 are located at different rows, the binning pixel set 170 and the binning pixel set 160 may be located at the same column.

The expression may be given as the binning pixel sets 170 and 180 are located in the horizontal direction or the vertical direction from the binning pixel set 160. For example, one binning pixel set 180 of the binning pixel sets 170 and 180 may be located in the horizontal direction from the binning pixel set 160. When one binning pixel set 180 of the binning pixel sets 170 and 180 is located in the horizontal direction from the binning pixel set 160, the other binning pixel set 170 of the binning pixel sets 170 and 180 may be located in the vertical direction from the binning pixel set 160.

A relationship between the binning pixel set 160 and the binning pixel sets 170 and 180 may be applied between a given binning pixel set of the binning pixel sets 160 to 190 and binning pixel sets next to the given binning pixel set. An example is illustrated in FIG. 3 as the binning pixel sets 160 to 190 are selected, but the inventive concept is not limited thereto.

Thus, the image sensor 1000 also include a second group of four pixel sets (e.g., pixel sets 160, 170, 180, and 190) having a second color (e.g., red), wherein the second group of four pixel sets is arranged in a second diamond pattern occupying two rows (e.g., Row 2 and Row 4) and two columns (Column 1 and Column 3), and wherein the converting circuit 200 is configured to perform the binning based at least in part on a second signal received from the second group of four pixel sets.

Figure 4:
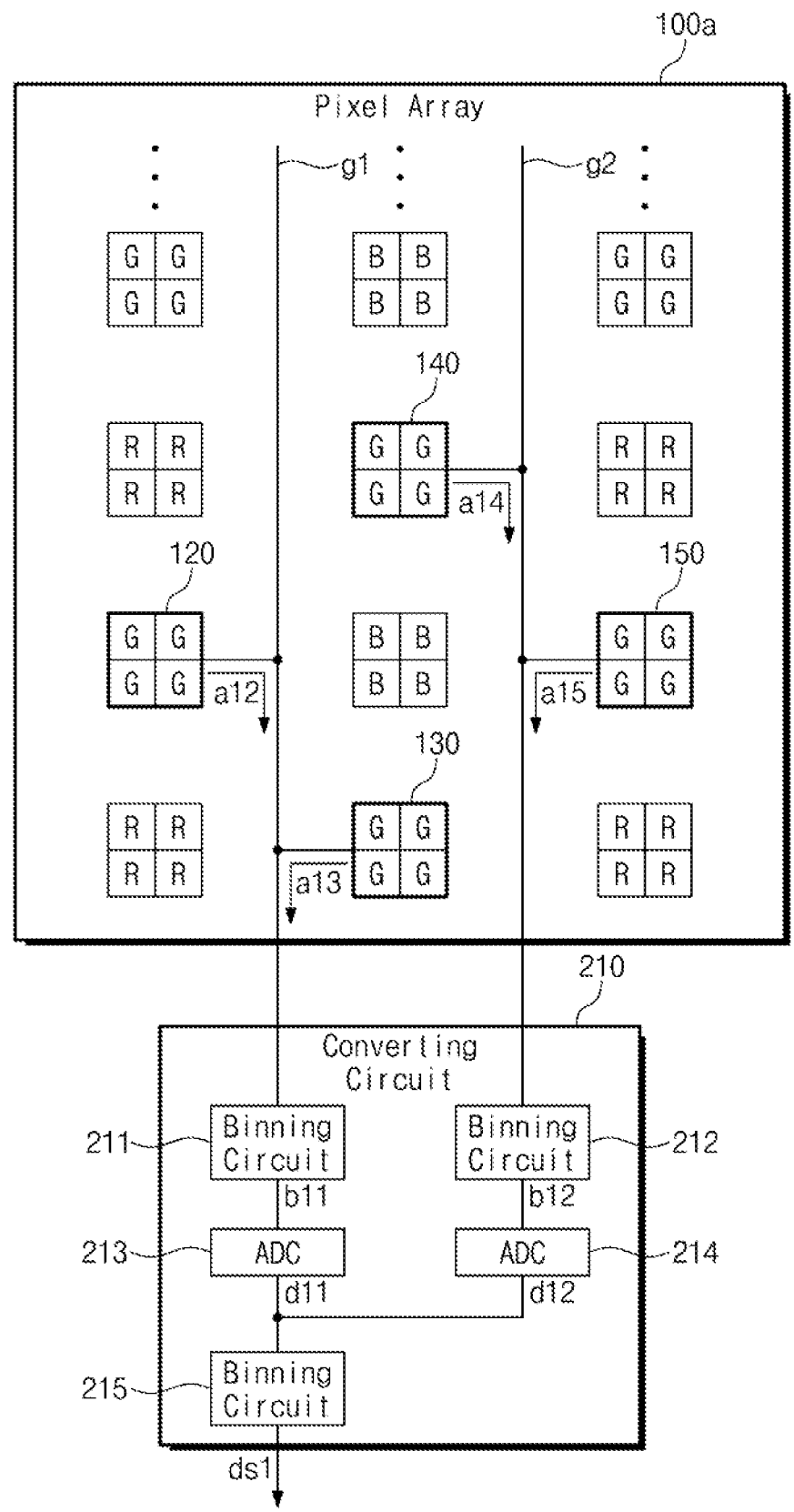
FIG. 4 is a block diagram for describing a method in which binning is performed in an image sensor according to an embodiment of the inventive concept.

FIG. 4 is a block diagram for describing a method in which binning is performed in an image sensor according to an embodiment of the inventive concept. A pixel array 100a may provide substantially the same operation as the pixel array 100 (described with reference to FIG. 1). A converting circuit 210 may provide substantially the same operation as the converting circuit 200 (described with reference to FIG. 1).

As described with reference to FIG. 2, the image sensor 1000 (described with reference to FIG. 1) may select the binning pixel sets 120 to 150 having the G filter. The binning pixel sets 120 to 150 having the G filter may output the analog signals a12, a13, a14, and a15. An exemplary method of performing diamond binning on the analog signals a12 to a15 will be described with reference to FIGS. 4 and 5. The diamond binning means binning performed on analog signals output from binning pixel sets.

Output lines g1 and g2 may be located between columns in the vertical direction one by one. The output lines g1 and g2 may be output lines that are connected with G pixel sets (e.g., 120 to 150).

For example, the output line g1 may be between a first column and a second column. The output line g1 may be connected with the binning pixel sets 120 and 130. The binning pixel sets 120 and 130 may output the analog signals a12 and a13 to the output line gl. The output line g2 may be between the second column and a third column. The output line g2 may be connected with the binning pixel sets 140 and 150. The binning pixel sets 140 and 150 may output the analog signals a14 and a15 to the output line g2. The pixel array 100a may output the analog signals a12 to a15 to the converting circuit 210 through the output lines g1 and g2.

The converting circuit 210 may include binning circuits 211, 212, and 215 and analog to digital converters (ADCs) 213 and 214. The binning circuits 211 and 212 may be a circuit that performs binning on the analog signals a12 to a15. The binning circuit 215 may be a circuit that performs binning on digital signals d11 and d12. A structure of the converting circuit 210 is not limited to the structure illustrated in FIG. 4. For example, the binning circuits 211 and 212 may be included in the pixel array 100a. For another example, the binning circuit 215 may be included in the ADC 213 or the ADC 214.

The binning circuit 211 may receive the analog signals a12 and a13. The analog signals a12 and a13 may indicate a voltage of level "L1" and a voltage of level "L2", respectively. The binning circuit 211 may perform binning on the analog signals a12 and a13. Noises included in the analog signals a12 and a13 may be canceled out while the binning is performed on the analog signals a12 and a13. The binning circuit 211 may perform binning to generate an analog signal b11. The analog signal b11 may indicate a voltage of level "L3". Level "L3" may correspond to a level "(L1+L2)" or smaller. For example, level "L3" may correspond to level "(L1+L2)/2".

The binning circuit 212 may receive the analog signals a14 and a15. The analog signals a14 and a15 may indicate a voltage of level "L4" and a voltage of level "L5", respectively. The binning circuit 212 may perform binning on the analog signals a14 and a15. Noises included in the analog signals a14 and a15 may be canceled out while the binning is performed on the analog signals a14 and a15. The binning circuit 212 may perform binning to generate an analog signal b12. The analog signal b12 may indicate a voltage of level "L6". Level "L6" may correspond to level "(L4+L5)" or smaller. For example, level "L6" may correspond to level "(L4+L5)/2".

The ADC 213 may receive the analog signal b11. The ADC 213 may perform digital conversion on the analog signal b11. That is, the ADC 213 may convert the analog signal b11 into a digital signal d11. The digital signal d11 may indicate a voltage of level "L3".

The ADC 214 may receive the analog signal b12. The ADC 214 may perform digital conversion on the analog signal b12. That is, the ADC 214 may convert the analog signal b12 into a digital signal d12. The digital signal d12 may indicate a voltage of level "L6".

The binning circuit 215 may receive the digital signals d11 and d12. The binning circuit 215 may perform binning on the digital signals d11 and d12. Noises included in the digital signals d11 and d12 may be canceled out while the binning is performed on the digital signals d11 and d12. The binning circuit 215 may perform binning on the digital signals d11 and d12 and may generate a digital signal ds1.

The binning circuit 215 may generate the digital signal ds1 by removing a part of bits constituting the digital signals d11 and d12. That is, the size of data included in the digital signal ds1 may be smaller than a total sum of sizes of data included in the digital signals d11 and d12. Accordingly, as the binning operation is performed in the converting circuit 210, the size of data to be processed by an electronic device including the image sensor 1000 may decrease. For example, the digital signal ds1 may indicate a voltage of level "L7". Level "L7" may correspond to a level "(L3+L6)" or smaller. For example, level "L7" may correspond to level "(L3+L6)/2".

Figure 5:
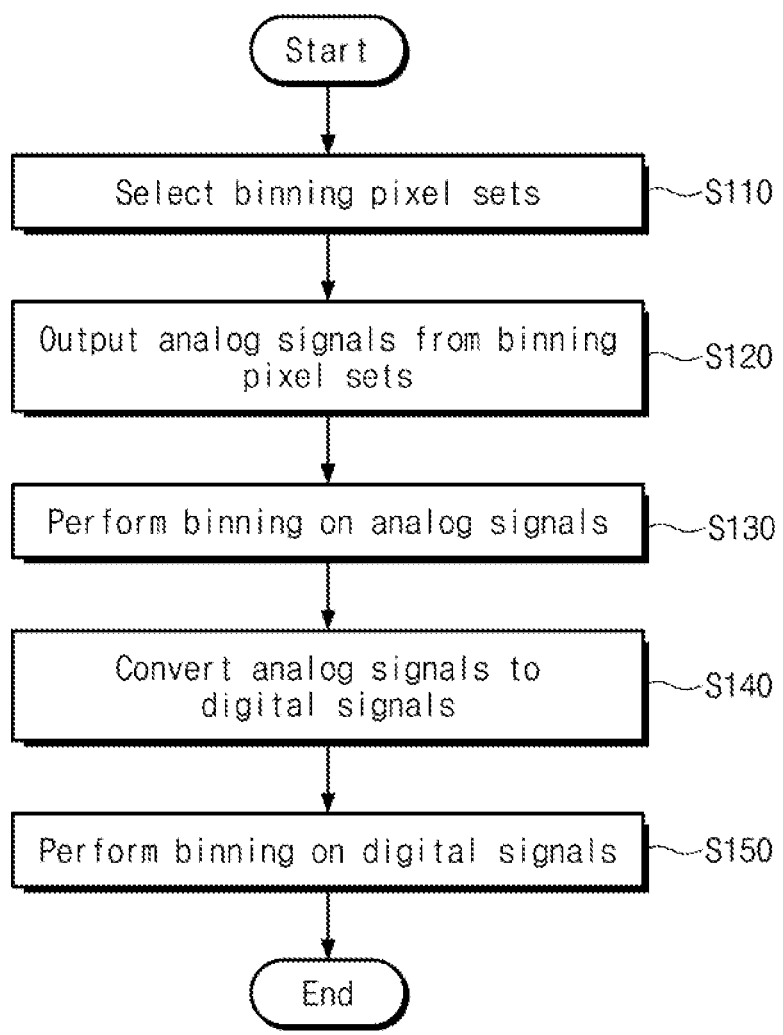
FIG. 5 is a flowchart illustrating a process in which binning is performed in an image sensor according to an embodiment of the inventive concept.

FIG. 5 is a flowchart illustrating a process in which binning is performed in an image sensor according to an embodiment of the inventive concept.

In operation S110, the controller 300 (described with reference to FIG. 1) may select the binning pixel sets 120 to 150 (described with reference to FIG. 4) having the G filter, based on the control signal c10.

In operation S120, the pixel array 100a (described with reference to FIG. 4) may output the analog signals a12 to a15 from the binning pixel sets 120 to 150.

In operation S130, the binning circuit 211 (described with reference FIG. 4) may perform binning on the analog signals a12 and a13 and may generate the analog signal b11. The binning circuit 212 (described with reference to FIG. 4) may perform binning on the analog signals a14 and a15 and may generate the analog signal b12.

In operation S140, the ADC 213 (described with reference to FIG. 4) may convert the analog signal b11 into the digital signal d11, based on the control signal c20. The ADC 214 (described with reference to FIG. 4) may convert the analog signal b12 into the digital signal d12, based on the control signal c20.

In operation S150, the binning circuit 215 (described with reference to FIG. 4) may perform binning on the digital signals d11 and d12 and may generate the digital signal ds1.

Figure 6:
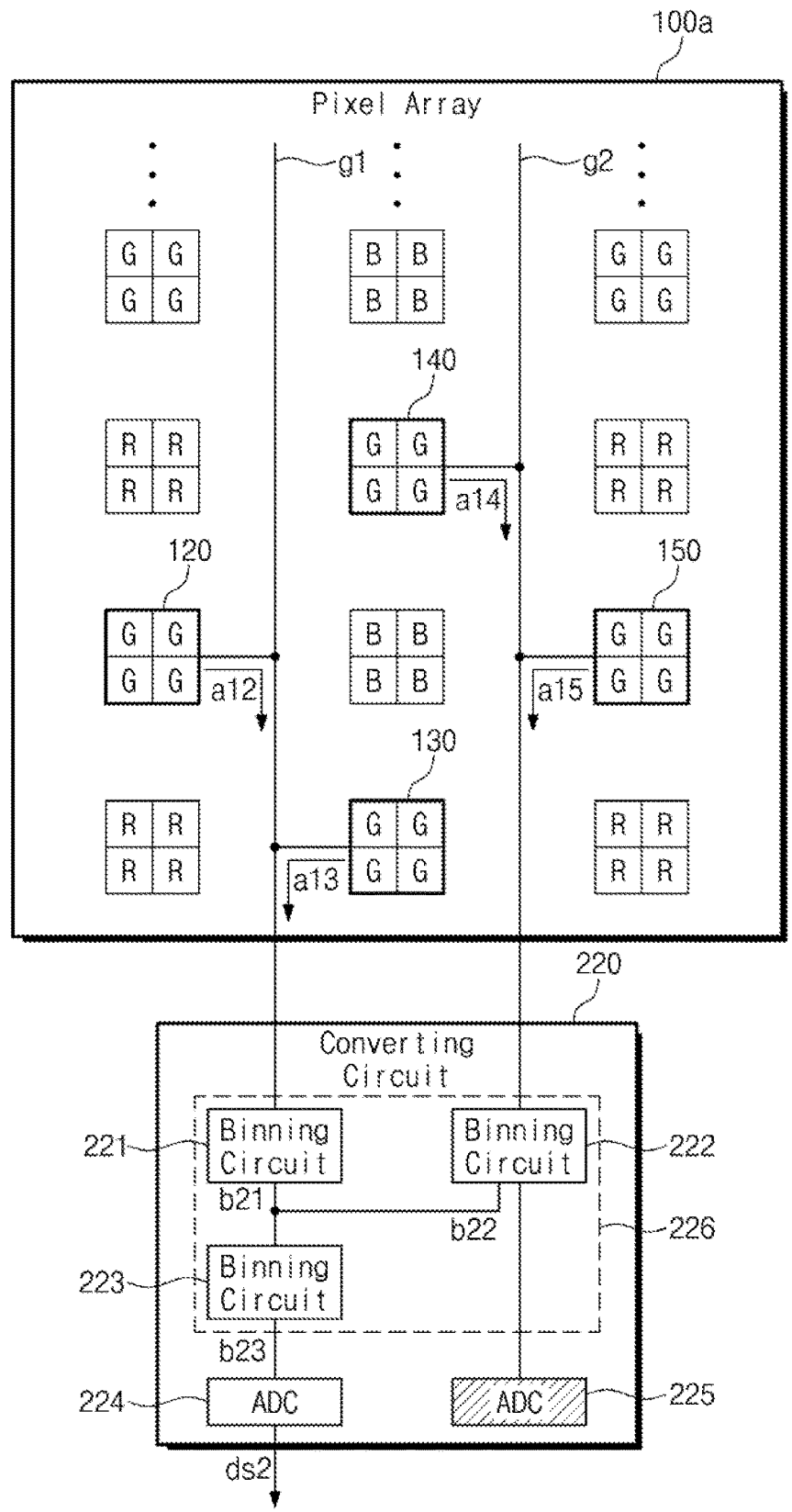
FIG. 6 is a block diagram for describing a method in which binning is performed in an image sensor according to an embodiment of the inventive concept.

FIG. 6 is a block diagram for describing a method in which binning is performed in an image sensor according to an embodiment of the inventive concept.

The pixel array 100a and the output lines g1 and g2 are described with reference to FIGS. 4 and 5, and thus, additional description will be omitted to avoid redundancy. A converting circuit 220 may provide substantially the same operation as the converting circuit 200 (described with reference to FIG. 1).

The image sensor 1000 (described with reference to FIG. 1) may select the binning pixel sets 120 to 150 having the G filter. The binning pixel sets 120 to 150 may output the analog signals a12 to a15. An exemplary method of performing diamond binning on the analog signals a12 to a15 will be described with reference to FIGS. 6 and 7.

The converting circuit 220 may include binning circuits 221, 222, and 223 and ADCs 224 and 225. The binning circuits 221, 222, and 223 may be a circuit that performs binning on the analog signals a12 to a15. The structure of the converting circuit 220 is not limited to the structure illustrated in FIG. 6. For example, the binning circuits 221 and 222 may be included in the pixel array 100a. For another example, the binning circuit 223 may be included in the ADC 224 or the ADC 225.

The binning circuit 221 may receive the analog signals a12 and a13. The analog signals a12 and a13 may indicate a voltage of level "L1" and a voltage of level "L2", respectively. The binning circuit 221 may perform binning on the analog signals a12 and a13. Noises included in the analog signals a12 and a13 may be canceled out while the binning is performed on the analog signals a12 and a13. The binning circuit 221 may perform binning to generate an analog signal b21. The analog signal b21 may indicate a voltage of level "L3". Level "L3" may correspond to a level "(L1+L2)" or smaller. For example, level "L3" may correspond to level "(L1+L2)/2".

The binning circuit 222 may receive the analog signals a14 and a15. The analog signals a14 and a15 may indicate a voltage of level "L4" and a voltage of level "L5", respectively. The binning circuit 222 may perform binning on the analog signals a14 and a15. Noises included in the analog signals a14 and a15 may be canceled out while the binning is performed on the analog signals a14 and a15. The binning circuit 222 may perform binning to generate an analog signal b22. The analog signal b22 may indicate a voltage of level "L6". Level "L6" may correspond to a level "(L4+L5)" or smaller. For example, level "L6" may correspond to level "(L4+L5)/2".

The binning circuit 223 may receive the analog signals b21 and b22. The analog signals b21 and b22 may indicate a voltage of level "L3" and a voltage of level "L6", respectively. The binning circuit 223 may perform binning on the analog signals b21 and b22. Noises included in the analog signals b21 and b22 may be canceled out while the binning is performed on the analog signals b21 and b22. The binning circuit 223 may perform binning to generate an analog signal b23. The analog signal b23 may indicate a voltage of level "L7". Level "L7" may correspond to a level "(L3+L6)" or smaller. For example, level "L7" may correspond to level "(L3+L6)/2".

However, the inventive concept is not limited thereto. For example, the converting circuit 220 may include one binning circuit 226 instead of the binning circuits 221, 222, and 223. The binning circuit 226 may receive the analog signals a12 to a15. The binning circuit 226 may perform binning on the analog signals a12 to a15. The binning circuit 226 may perform binning to generate the analog signal b23. When the binning circuits 221, 222, and 223 are used, the analog signal b23 may be generated through three binning operations. In contrast, when the binning circuit 226 is used, the analog signal b23 may be generated through one binning operation.

The ADC 224 may receive the analog signal b23. The ADC 224 may perform digital conversion on the analog signal b23. That is, the ADC 224 may convert the analog signal b23 into a digital signal ds2. The digital signal ds2 may indicate a voltage of level "L7".

Level "L7" that the digital signal ds2 indicates may be lower than a total sum of levels L1, L2, L4, and L5 that the analog signals a12 to a15 indicate. That is, as binning is performed on the analog signals a12 to a15, level "L7" indicated by the digital signal ds2 may decrease. As level "L7" decreases, the number of bites involved in the process of indicating level "L7" may decrease. That is, the size of data that the digital signal ds2 indicates may decrease. Also, the size of data to be processed by the image sensor 1000 may decrease.

The binning circuit 222 may not output the analog signal b22 to the ADC 225. The ADC 225 may be turned off while digital conversion is performed on the analog signal b22 in the ADC 224. Accordingly, power consumption of the image sensor 1000 may decrease.

Figure 7:
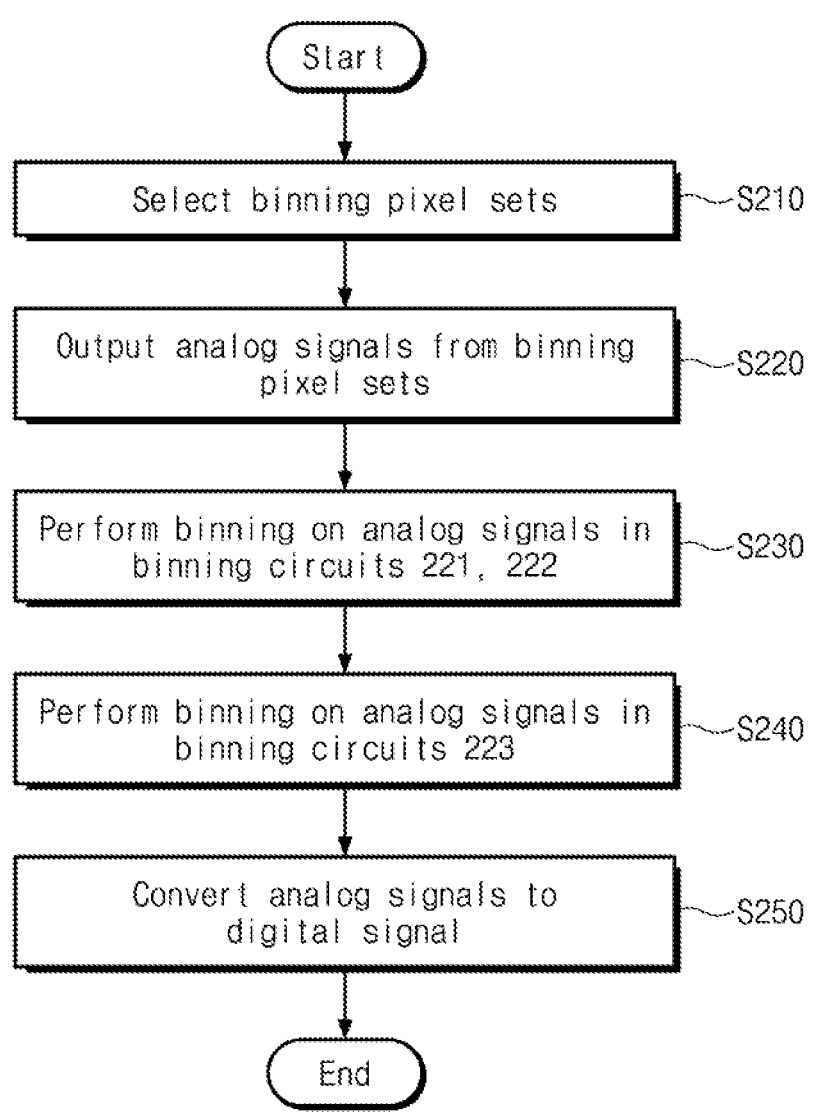
FIG. 7 is a flowchart illustrating a process in which binning is performed in an image sensor according to an embodiment of the inventive concept.

FIG. 7 is a flowchart illustrating a process in which binning is performed in an image sensor according to an embodiment of the inventive concept.

In operation S210, the controller 300 (described with reference to FIG. 1) may select the binning pixel sets 120 to 150 (described with reference to FIG. 6) having the G filter, based on the control signal c10.

In operation S220, the pixel array 100a (described with reference to FIG. 6) may output the analog signals a12 to a15 from the binning pixel sets 120 to 150.

In operation S230, the binning circuit 221 (described with reference to FIG. 6) may perform binning on the analog signals a12 and a13 and may generate the analog signal b21. The binning circuit 222 (described with reference to FIG. 6) may perform binning on the analog signals a14 and a15 and may generate the analog signal b22.

In operation S240, the binning circuit 223 (described with reference to FIG. 6) may perform binning on the analog signals b21 and b22 and may generate the analog signal b23.

In operation S250, the ADC 224 (described with reference to FIG. 6) may convert the analog signal b23 into the digital signal ds2.

Figure 8:
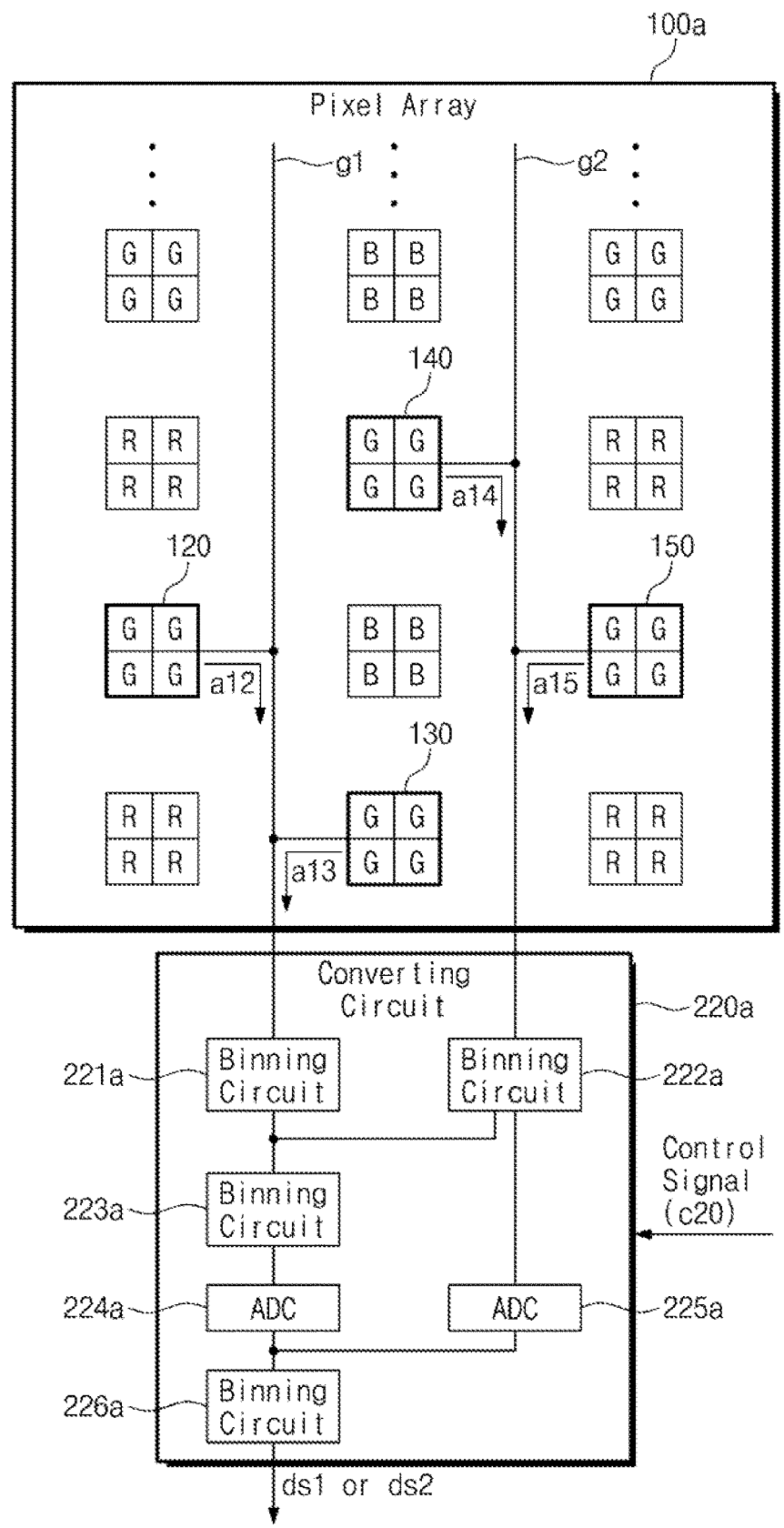
FIG. 8 is a block diagram for describing a method in which binning is performed in an image sensor according to an embodiment of the inventive concept.

FIG. 8 is a block diagram for describing a method in which binning is performed in an image sensor according to an embodiment of the inventive concept.

A converting circuit 220a may include binning circuits 221a, 222a, 223a, and 226a and ADCs 224a and 225a. The converting circuit 220a may receive the control signal c20. The control signal c20 may have a first logical value or a second logical value. The first logical value and the second logical value may be different. In the following descriptions, that the control signal c20 has the first logical value may mean that the control signal c20 has a voltage of a first level corresponding to the first logical value. Also, that the control signal c20 has the second logical value may mean that the control signal c20 has a voltage of a second level corresponding to the second logical value.

The converting circuit 220a may provide different operations, depending on a logical value of the control signal c20. For example, depending on a logical value of the control signal c20, the converting circuit 220a may provide substantially the same operation as the converting circuit 210 or may provide substantially the same operation as the converting circuit 220. A logical value of the control signal c20 may be determined according to a request of a user or a mode of an electronic device. That is, the converting circuit 220a may provide different operations depending on the request of the user or the mode of the electronic device.

When the control signal c20 has the first logical value, the converting circuit 220a may provide substantially the same operation as the converting circuit 210. When the control signal c20 having the first logical value is received, the converting circuit 220a may turn off the binning circuit 223a. Accordingly, operations of the components 221a, 222a, 224a, 225a, and 226a may provide operations of the components 211, 212, 213, 214, and 215 of FIG. 4. Accordingly, as described with reference to FIGS. 4 and 5, the converting circuit 220a may perform binning and digital conversion on the analog signals a12 to a15 to output the digital signal ds1.

When the control signal c20 has the second logical value, the converting circuit 220a may provide substantially the same operation as the converting circuit 220. When the control signal c20 having the second logical value is received, the converting circuit 220a may turn off the ADC 225a and the binning circuit 226a. Accordingly, operations of the components 221a, 222a, 223a, and 224a may provide substantially the same as the operations of the components 221, 222, 223, and 224 of FIG. 6. Accordingly, as described with reference to FIGS. 6 and 7, the converting circuit 220*a* may perform binning and digital conversion on the analog signals a12 to a15 to output the digital signal ds2.

Figure 9:
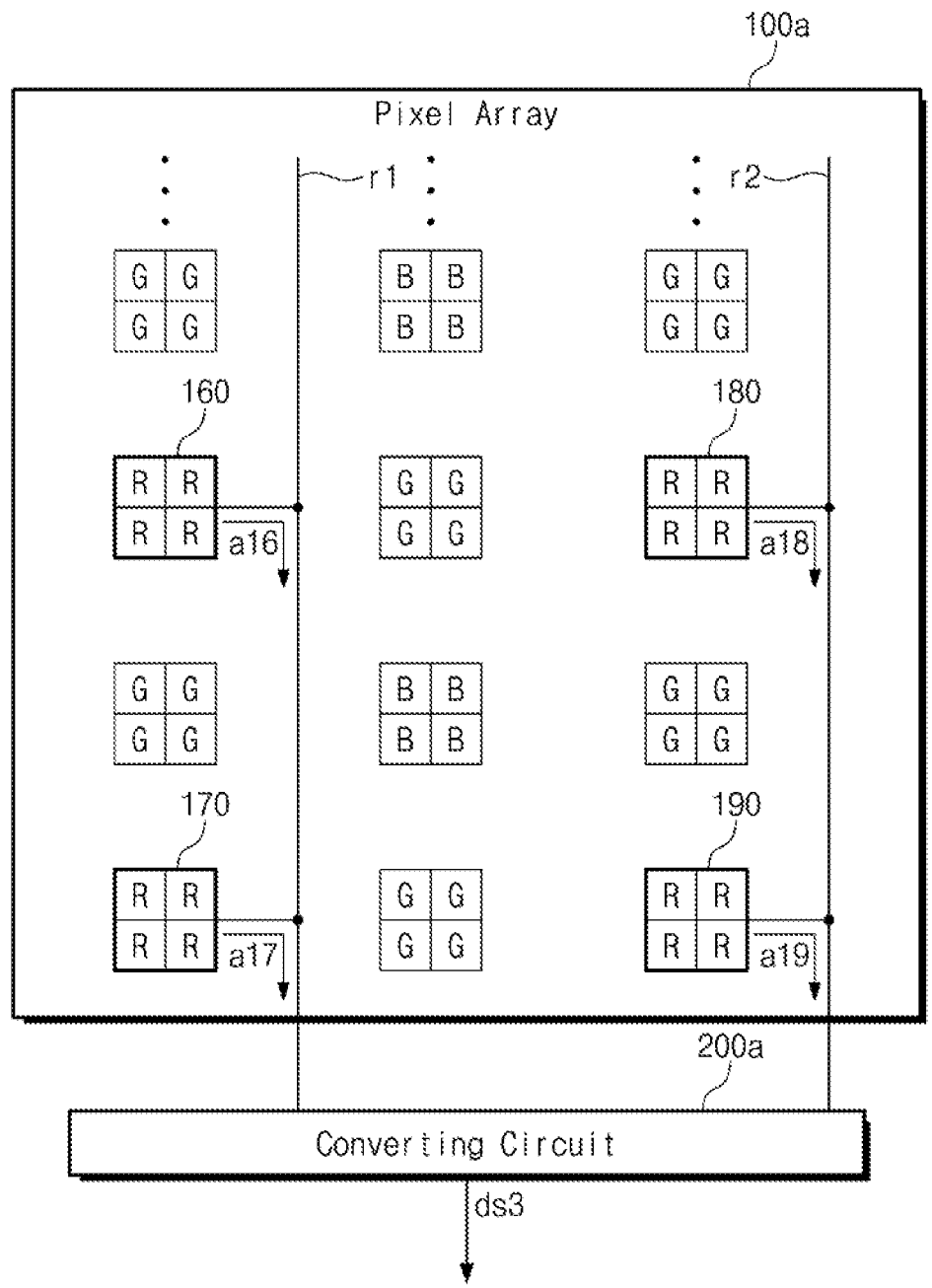
FIG. 9 is a block diagram for describing a method in which binning is performed in an image sensor according to an embodiment of the inventive concept.

FIG. 9 is a block diagram for describing a method in which binning is performed in an image sensor according to an embodiment of the inventive concept.

As described with reference to FIG. 3, the image sensor 1000 (described with reference to FIG. 1) may select the binning pixel sets 160 to 190 having the R filter. The binning pixel sets 160 to 190 having the R filter may output the analog signals a16, a17, a18, and a19. An exemplary method of performing diamond binning on the analog signals a16 to a19 will be described with reference to FIG. 9. A way to perform binning on analog signals output from binning pixel sets having the B filter may be substantially the same to be described with reference to FIG. 9.

Output lines r1 and r2 may be located between columns in the vertical direction one by one. The output lines r1 and r2 may be output lines that are connected with R pixel sets (e.g., 160 to 190).

For example, the output line r1 may be between a first column and a second column. The output line r1 may be connected with the binning pixel sets 160 and 170. The binning pixel sets 160 and 170 may output analog signals a16 and a17 to the output line r1. The output line r2 may be between the second column and a third column. The output line r2 may be connected with the binning pixel sets 180 and 190. The binning pixel sets 180 and 190 may output analog signals a18 and a19 to the output line r2. The pixel array 100*a* may output the analog signals a16 to a19 to the converting circuit 200*a* through the output lines r1 and r2.

The converting circuit 200*a* may perform binning and digital conversion on the analog signals a16 to a19 to output a digital signal ds3.

For example, a structure and an operation of the converting circuit 200*a* may be substantially the same as the structure and the operation of the converting circuit 210. In this case, the converting circuit 200*a* may perform binning and digital conversion on the analog signals a16 to a19 like the converting circuit 210 performs binning and digital conversion on the analog signals a12 to a15. As described with reference to FIGS. 4 and 5, the converting circuit 200*a* may process the analog signals a16 to a19 to output the digital signal ds3.

For another example, a structure and an operation of the converting circuit 200*a* may be substantially the same as the structure and the operation of the converting circuit 220. In this case, the converting circuit 200*a* may perform binning and digital conversion on the analog signals a16 to a19 like the converting circuit 220 performs binning and digital conversion on the analog signals a12 to a15. As described with reference to FIGS. 6 and 7, the converting circuit 200*a* may process the analog signals a16 to a19 to output the digital signal ds3.

For another example, a structure and an operation of the converting circuit 200*a* may be substantially the same as the structure and the operation of the converting circuit 220*a*. In this case, the converting circuit 200*a* may perform binning and digital conversion on the analog signals a16 to a19 like the converting circuit 220*a* performs binning and digital conversion on the analog signals a12 to a15. As described with reference to FIG. 8, the converting circuit 200*a* may process the analog signals a16 to a19 to output the digital signal ds3.

Figure 10:
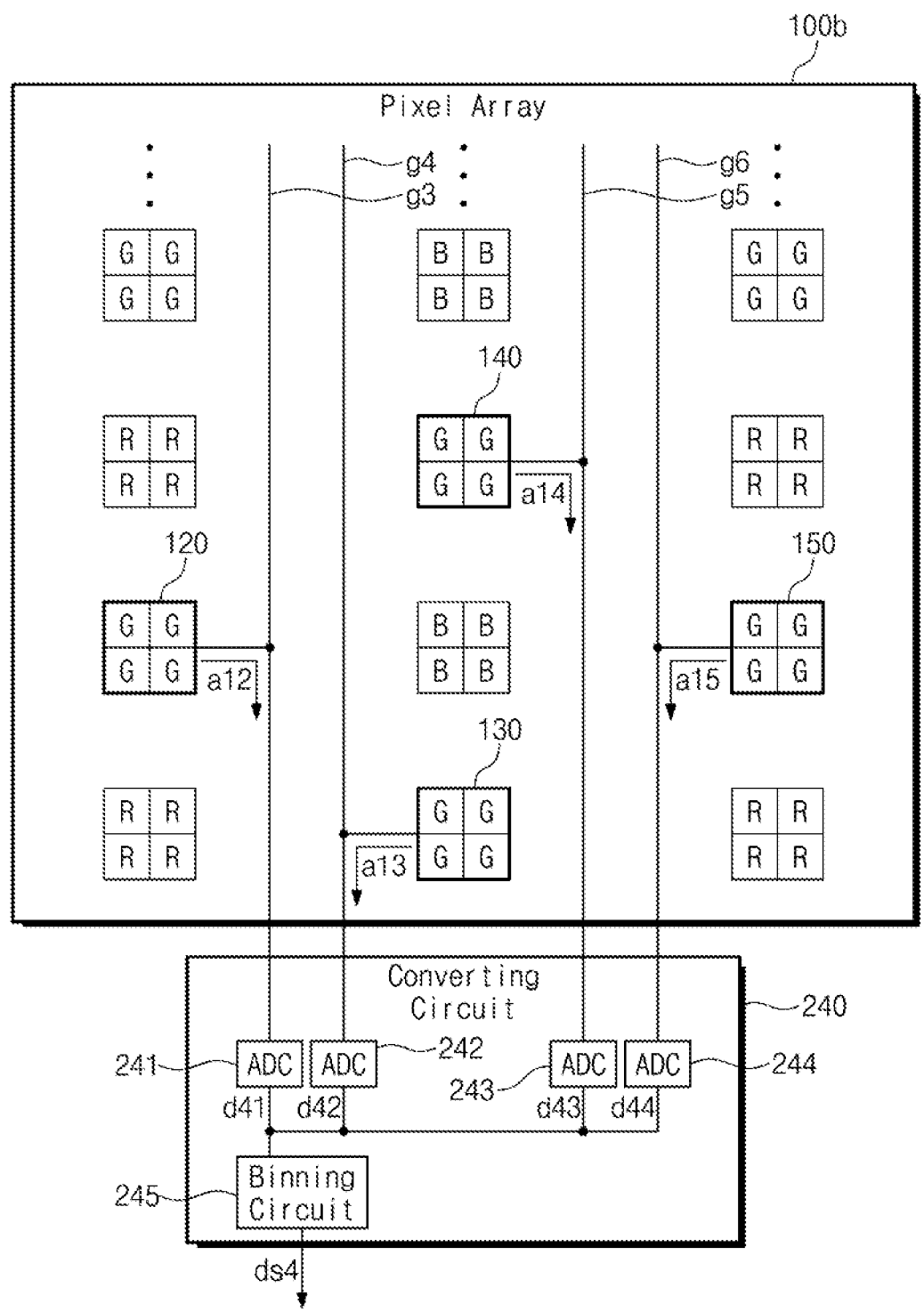
FIG. 10 is a block diagram for describing a method in which binning is performed in an image sensor according to an embodiment of the inventive concept.

FIG. 10 is a block diagram for describing a method in which binning is performed in an image sensor according to an embodiment of the inventive concept.

The image sensor 1000 (described with reference to FIG. 1) may select the binning pixel sets 120 to 150 having the G filter. The binning pixel sets 120 to 150 may output the analog signals a12 to a15. An exemplary method of performing diamond binning on the analog signals a12 to a15 will be described with reference to FIGS. 10 and 11.

An operation of a pixel array 100*b* may be like the operation of the pixel array 100*a*. However, unlike the description given with reference to FIGS. 4 to 9, output lines g3, g4, g5, and g6 may be pairwise arranged between columns. The pixel array 100*b* may output the analog signals a12 to a15 through output lines g3 to g6, respectively.

For example, the output lines g3 to g6 may be located between columns in the vertical direction. The output lines g3 to g6 may be output lines that are connected with G pixel sets (e.g., 120 to 150).

The output lines g3 and g4 may be between a first column and a second column. The output lines g3 and g4 may be connected with the binning pixel sets 120 and 130, respectively. The binning pixel sets 120 and 130 may output the analog signals a12 and a13 to the output lines g3 and g4, respectively. The output lines g5 and g6 may be between the second column and a third column. The output lines g5 and g6 may be connected with the binning pixel sets 140 and 150, respectively. The binning pixel sets 140 and 150 may output the analog signals a14 and a15 to the output lines g5 and g6, respectively. The pixel array 100*b* may output the analog signals a12 to a15 to a converting circuit 240 through the output lines g3 to g6.

The converting circuit 240 may provide substantially the same operation as the converting circuit 200. The converting circuit 240 may include ADCs 241, 242, 243, and 244 and a binning circuit 245. The binning circuit 245 may be a circuit that performs binning on digital signals d41, d42, d43, and d44. A structure of the converting circuit 240 is not limited to the structure illustrated in FIG. 10. For example, the binning circuit 245 may be included in one of the ADCs 241 to 244.

The ADCs 241 to 244 may receive the analog signals a12 to a15. As described with reference to FIGS. 4 and 5, the analog signals a12 to a15 may indicate a voltage of level "L1", a voltage of level "L2", a voltage of level "L4", and a voltage of level "L5", respectively. The ADCs 241 to 244 may perform digital conversion on the analog signals a12 to a15. That is, the ADCs 241 to 244 may convert the analog signals a12 to a15 to digital signals d41 to d44, respectively. The digital signals d41 to d44 may indicate a voltage of level "L1", a voltage of level "L2", a voltage of level "L4", and a voltage of level "L5", respectively.

The binning circuit 245 may receive the digital signals d41 to d44. The binning circuit 245 may perform binning on the digital signals d41 to d44. The binning circuit 245 may perform binning to generate a digital signal ds4. The digital signal ds4 may indicate a voltage of level "L7". Level "L7" may correspond to a level "(L1+L2+L4+L5)" or smaller. For example, level "L7" may correspond to level "(L1+L2+L4+L5)/4".

Noises may be included in the digital signals d41 to d44 while the analog signals a12 to a15 are converted into the digital signals d41 to d44. The converting circuit 240 may convert the analog signals a12 to a15 into the digital signals d41 to d44 and may then perform binning on a result of the conversion. Noises included in the digital signals d41 to d44 may be canceled out while the binning is performed on the digital signals d41 to d44. That is, the converting circuit 240 may generate the digital signal ds4 in a state where noises occurring in digital conversion are canceled out.

Figure 11:
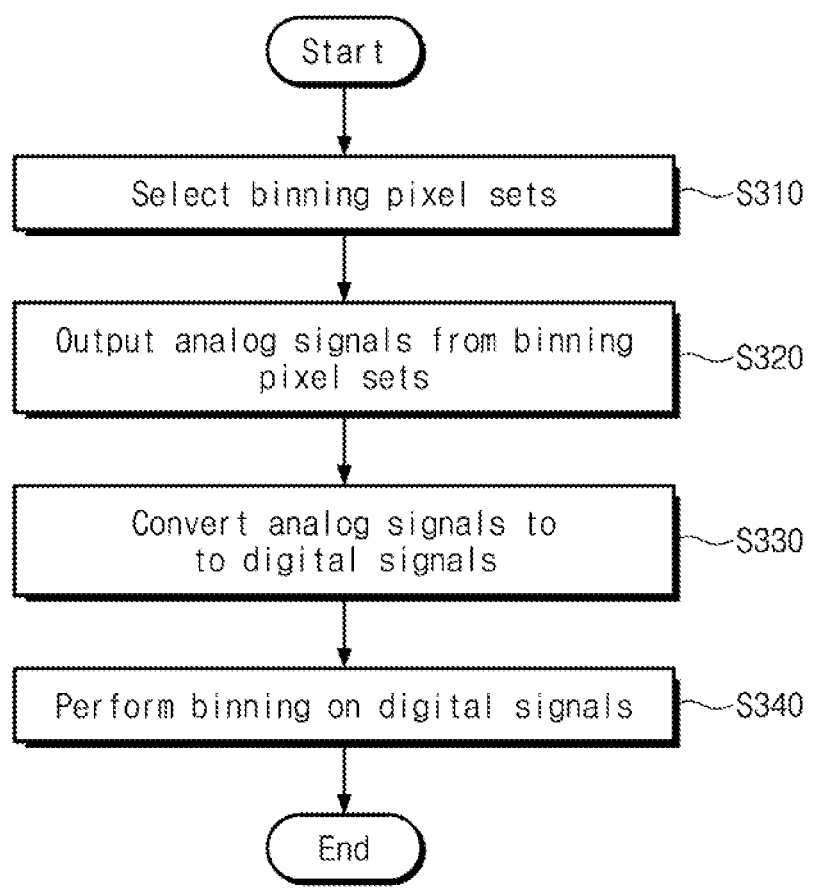
FIG. 11 is a flowchart illustrating a process in which binning is performed in an image sensor according to an embodiment of the inventive concept.

FIG. 11 is a flowchart illustrating a process in which binning is performed in an image sensor according to an embodiment of the inventive concept.

In operation S310, the controller 300 (described with reference to FIG. 1) may select the binning pixel sets 120 to 150 (described with reference to FIG. 6) having the G filter, based on the control signal c10.

In operation S320, the pixel array 100b (described with reference to FIG. 10) may output the analog signals a12 to a15 from the binning pixel sets 120 to 150.

In operation S330, the ADCs 241 to 244 (described with reference to FIG. 10) may convert the analog signals a12 to a15 to the digital signals d41 to d44, respectively.

In operation S340, the binning circuit 245 (described with reference to FIG. 10) may perform binning on the digital signals d41 to d44 and may generate the digital signal ds4.

Figure 12:
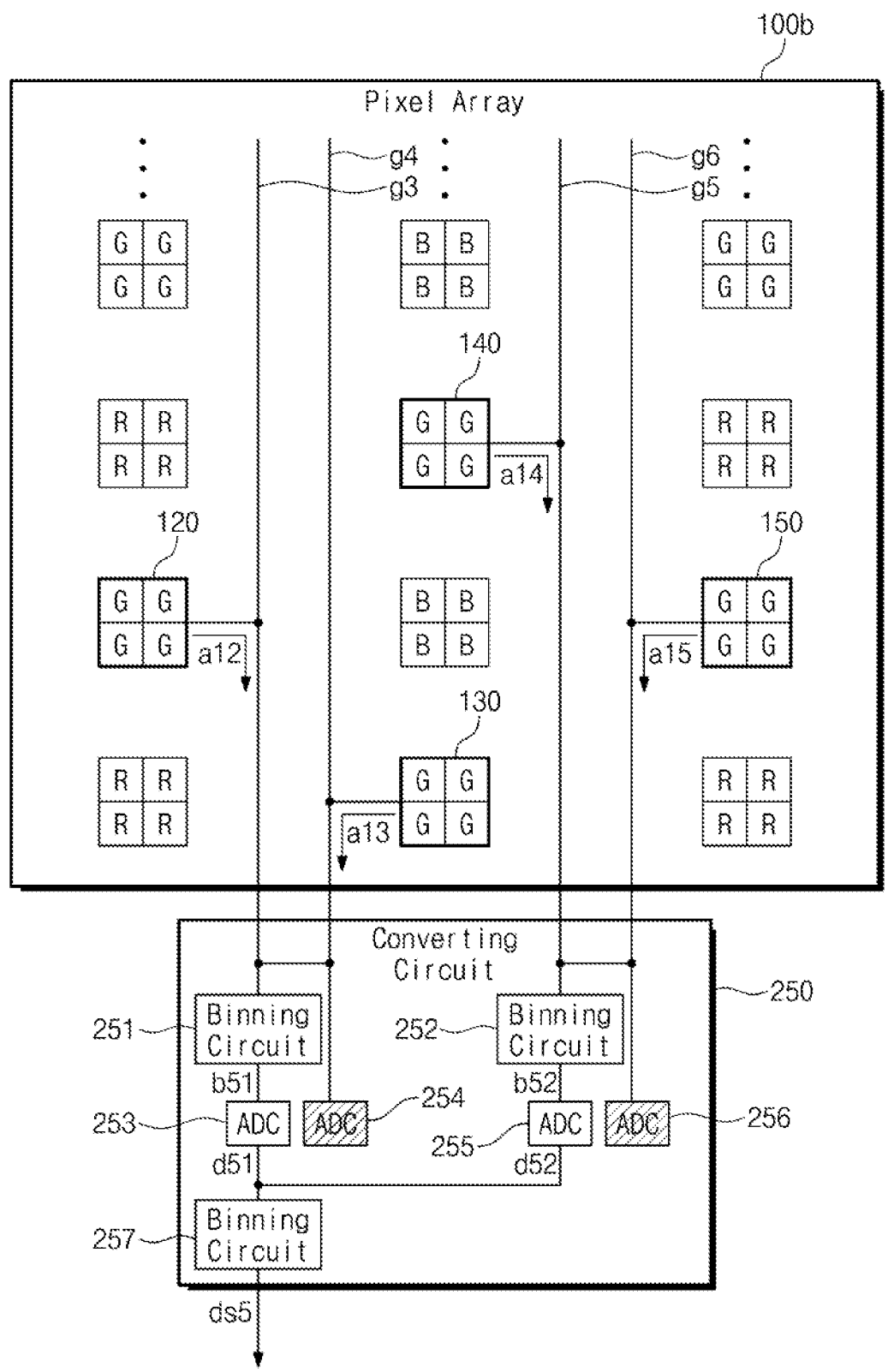
FIG. 12 is a block diagram for describing a method in which binning is performed in an image sensor according to an embodiment of the inventive concept.

FIG. 12 is a block diagram for describing a method in which binning is performed in an image sensor according to an embodiment of the inventive concept.

A converting circuit 250 may provide substantially the same operation as the converting circuit 200 (described with reference to FIG. 1). The pixel array 100b and the output lines g3 to g6 are described with reference to FIGS. 10 and 11, and thus, additional description will be omitted to avoid redundancy.

The image sensor 1000 (described with reference to FIG. 1) may select the binning pixel sets 120 to 150 having the G filter. The binning pixel sets 120 to 150 may output the analog signals a12 to a15. An exemplary method of performing diamond binning on the analog signals a12 to a15 will be described with reference to FIGS. 12 and 13.

The converting circuit 250 may include binning circuits 251, 252, and 257 and ADCs 253, 254, 255, and 256. The binning circuits 251 and 252 may be a circuit that performs binning on the analog signals a12 to a15. The binning circuit 257 may be a circuit that performs binning on digital signals d51 and d52. A structure of the converting circuit 250 is not limited to the structure illustrated in FIG. 12. For example, the binning circuit 251 may be included in the ADC 253 or the ADC 254. For another example, the binning circuit 252 may be included in the ADC 255 or the ADC 256.

The binning circuit 251 may receive the analog signals a12 and a13. The analog signals a12 and a13 may indicate a voltage of level "L1" and a voltage of level "L2", respectively. The binning circuit 251 may perform binning on the analog signals a12 and a13. Noises included in the analog signals a12 and a13 may be canceled out while the binning is performed on the analog signals a12 and a13. The binning circuit 251 may perform binning to generate an analog signal b51. The analog signal b51 may indicate a voltage of level "L3". Level "L3" may correspond to a level "(L1+L2)" or smaller. For example, level "L3" may correspond to level "(L1+L2)/2".

The binning circuit 252 may receive the analog signals a14 and a15. The analog signals a14 and a15 may indicate a voltage of level "L4" and a voltage of level "L5", respectively. The binning circuit 252 may perform binning on the analog signals a14 and a15. Noises included in the analog signals a14 and a15 may be canceled out while the binning is performed on the analog signals a14 and a15. The binning circuit 252 may perform binning to generate an analog signal b52. The analog signal b52 may indicate a voltage of level "L6". Level "L6" may correspond to a level "(L4+L5)" or smaller. For example, level "L6" may correspond to level "(L4+L5)/2".

The ADC 253 may receive the analog signal b51. The ADC 253 may convert the analog signal b51 into a digital signal d51. The digital signal d51 may indicate a voltage of level "L3".

The binning circuit 251 may not output the analog signal b51 to the ADC 254. In this case, the converting circuit 250 may turn off the ADC 254 while digital conversion is performed in the ADC 253. However, the inventive concept is not limited thereto. For example, the binning circuit 251 may output the analog signal b51 to the ADC 254 and may not output the analog signal b51 to the ADC 253. In this case, the converting circuit 250 may turn off the ADC 253 while digital conversion is performed in the ADC 254. Accordingly, power consumption of the image sensor 1000 may decrease.

The ADC 255 may receive the analog signal b52. The ADC 255 may convert the analog signal b52 into a digital signal d52. The digital signal d52 may indicate a voltage of level "L6".

The binning circuit 252 may not output the analog signal b52 to the ADC 256. In this case, the converting circuit 250 may turn off the ADC 256 while digital conversion is performed in the ADC 255. However, the inventive concept is not limited thereto. For example, the binning circuit 252 may output the analog signal b52 to the ADC 256 and may not output the analog signal b52 to the ADC 255. In this case, the converting circuit 250 may turn off the ADC 255 while digital conversion is performed in the ADC 256. Accordingly, power consumption of the image sensor 1000 may decrease.

The binning circuit 257 may receive the digital signals d51 and d52. The binning circuit 257 may perform binning on the digital signals d51 and d52. Noises included in the digital signals d51 and d52 may be canceled out while the binning is performed on the digital signals d51 and d52.

Level "L7" that a digital signal ds5 indicates may be lower than a total sum of levels L1, L2, L4, and L5 that the analog signals a12 to a15 indicate. That is, as binning is performed on the analog signals a12 to a15, level "L7" indicated by the digital signal ds5 may decrease. As level "L7" decreases, the number of bites used to indicate level "L7" may decrease. Accordingly, the size of data to be processed by the image sensor 1000 may decrease. For example, the digital signal ds5 may indicate a voltage of level "L7". Level "L7" may correspond to a level "(L3+L6)" or smaller. For example, level "L7" may correspond to level "(L3+L6)/2".

Figure 13:
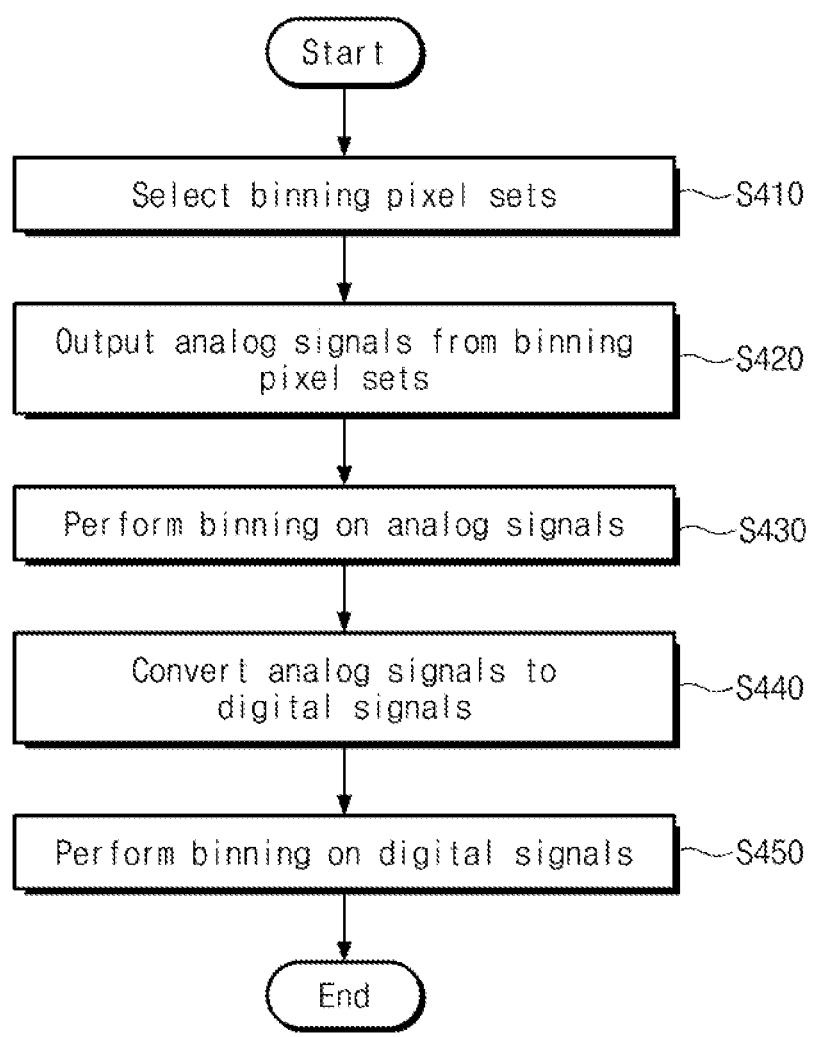
FIG. 13 is a flowchart illustrating a process in which binning is performed in an image sensor according to an embodiment of the inventive concept.

FIG. 13 is a flowchart illustrating a process in which binning is performed in an image sensor according to an embodiment of the inventive concept.

In operation S410, the controller 300 (described with reference to FIG. 1) may select the binning pixel sets 120 to 150 (described with reference to FIG. 12) having the G filter, based on the control signal c10.

In operation S420, the pixel array 100b (described with reference to FIG. 12) may output the analog signals a12 to a15 from the binning pixel sets 120 to 150.

In operation S430, the binning circuit 251 (described with reference to FIG. 12) may perform binning on the analog signals a12 and a13 and may generate the analog signal b51. The binning circuit 252 (described with reference to FIG. 12) may perform binning on the analog signals a14 and a15 and may generate the analog signal b51.

In operation S430, the ADCs 253 and 255 may convert the analog signals b51 and b52 to the digital signals d51 and d52, respectively.

In operation S450, the binning circuit 257 (described with reference to FIG. 4) may perform binning on the digital signals d51 and d52 and may generate the digital signal ds5.

Figure 14:
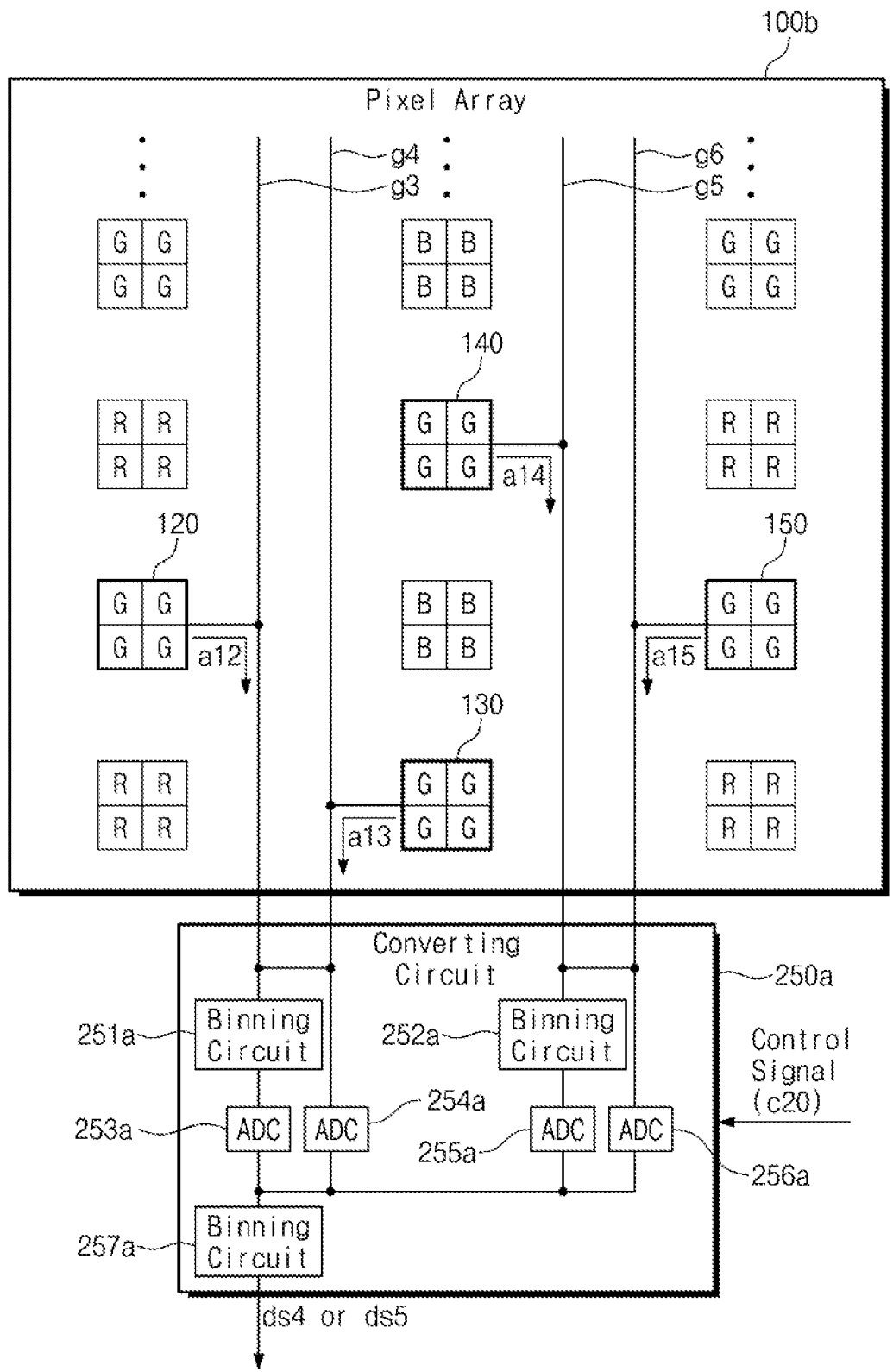
FIG. 14 is a block diagram for describing a method in which binning is performed in an image sensor according to an embodiment of the inventive concept.

FIG. 14 is a block diagram for describing a method in which binning is performed in an image sensor according to an embodiment of the inventive concept.

A converting circuit 250a may include binning circuits 251a, 252a, and 257a and ADCs 253a, 254a, 255a, and 256a. The converting circuit 250a may receive the control signal c20. The control signal c20 may have a first logical value or a second logical value. The first logical value and the second logical value may be different. The converting circuit 250a may provide different operations, depending on a logical value of the control signal c20. For example, depending on a logical value of the control signal c20, the converting circuit 250a may provide substantially the same operation as the converting circuit 240 or may provide substantially the same operation as the converting circuit 250. A logical value of the control signal c20 may be determined according to a request of a user or a mode of an electronic device. That is, the converting circuit 250a may provide different operations depending on the request of the user or the mode of the electronic device.

When the control signal c20 has the first logical value, the converting circuit 250a may provide substantially the same operation as the converting circuit 240. When the control signal c20 having the first logical value is received, the converting circuit 250a may turn off the binning circuits 251a and 252a. Accordingly, operations of the components 253a to 256a and 257a may provide substantially the same as the operations of the components 221 to 244 and 245 of FIG. 10. Accordingly, as described with reference to FIGS. 10 and 11, the converting circuit 250a may perform binning and digital conversion on the analog signals a12 to a15 to output the digital signal ds4.

When the control signal c20 has the second logical value, the converting circuit 250a may provide substantially the same operation as the converting circuit 250. When the control signal c20 having the second logical value is received, the converting circuit 250a may turn off the ADCs 254a and 256a. Accordingly, operations of the components 251a, 252a, 253a, 255a, and 257a may provide substantially the same as the operations of the components 251, 252, 253, 255, and 257 of FIG. 12. In this case, as described with reference to FIGS. 12 and 13, the converting circuit 250a may perform binning and digital conversion on the analog signals a12 to a15 to output the digital signal ds5.

Figure 15:
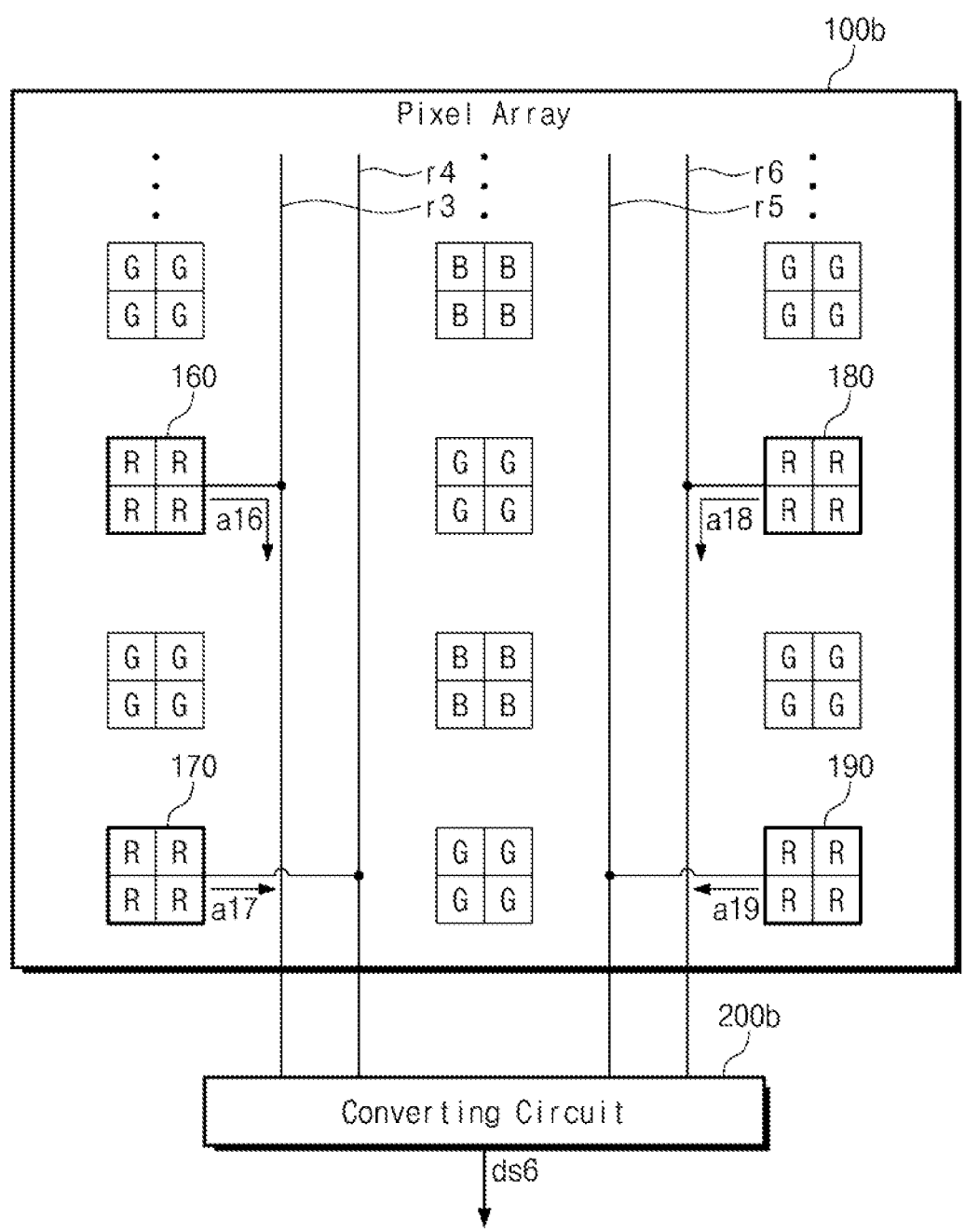
FIG. 15 is a block diagram for describing a method in which binning is performed in an image sensor according to an embodiment of the inventive concept.

FIG. 15 is a block diagram for describing a method in which binning is performed in an image sensor according to an embodiment of the inventive concept.

As described with reference to FIG. 3, the image sensor 1000 (described with reference to FIG. 1) may select the binning pixel sets 160 to 190 having the R filter. The binning pixel sets 160 to 190 may output the analog signals a16 to a19. An exemplary method of performing diamond binning on the analog signals a16 to a19 will be described with reference to FIG. 15. A method of binning on the analog signal's output from binning pixel sets using the B filter may be substantially the same, and will be described with reference to FIG. 15.

Unlike the description given with reference to FIG. 9, output lines r3, r4, r5, and r6 may be pairwise arranged between columns in the vertical direction. The output lines r3 to r6 may be connected with the R binning pixel sets 160 to 190, respectively.

For example, the output lines r3 and r4 may be between a first column and a second column. The output lines r3 and r4 may be connected with the binning pixel sets 160 and 170, respectively. The binning pixel sets 160 and 170 may output the analog signals a16 and a17 to the output lines r3 and r4, respectively. The output lines r5 and r6 may be between the second column and a third column. The output lines r5 and r6 may be connected with the binning pixel sets 190 and 180, respectively. The binning pixel sets 180 and 190 may output the analog signals a18 and a19 to the output lines r6 and r5, respectively. The pixel array 100b may output the analog signals a16 to a19 to a converting circuit 200b through the output lines r3 to r6.

The converting circuit 200b may perform binning and digital conversion on the analog signals a16 to a19 to output a digital signal ds6. For example, a structure and an operation of the converting circuit 200b may be substantially the same as the structure and the operation of the converting circuit 240 (described with reference to FIG. 10). In this case, the converting circuit 200b may perform binning and digital conversion on the analog signals a16 to a19 in a method that is substantially the same as the method in which the converting circuit 240 performs binning and digital conversion on the analog signals a12 to a15.

Accordingly, as described with reference to FIGS. 10 and 11, the converting circuit 200b may perform binning and digital conversion on the analog signals a16 to a19 to generate the digital signal ds6.

For another example, a structure and an operation of the converting circuit 200b may be substantially the same as the structure and the operation of the converting circuit 250 (described with reference to FIG. 12). In this case, the converting circuit 200b may perform binning and digital conversion on the analog signals a16 to a19 in a method that is substantially the same as the method in which the converting circuit 250 performs binning and digital conversion on the analog signals a12 to a15. Accordingly, as described with reference to FIGS. 12 and 13, the converting circuit 200b may perform binning and digital conversion on the analog signals a16 to a19 to generate the digital signal ds6.

For another example, a structure and an operation of the converting circuit 200b may be substantially the same as the structure and the operation of the converting circuit 250a (described with reference to FIG. 14). In this case, the converting circuit 200b may perform binning and digital conversion on the analog signals a16 to a19 in a method that is substantially the same as the method in which the converting circuit 250a performs binning and digital conversion on the analog signals a12 to a15. Accordingly, as described with reference to FIG. 14, the converting circuit 200b may perform binning and digital conversion on the analog signals a16 to a19 to generate the digital signal ds6.

Figure 16:
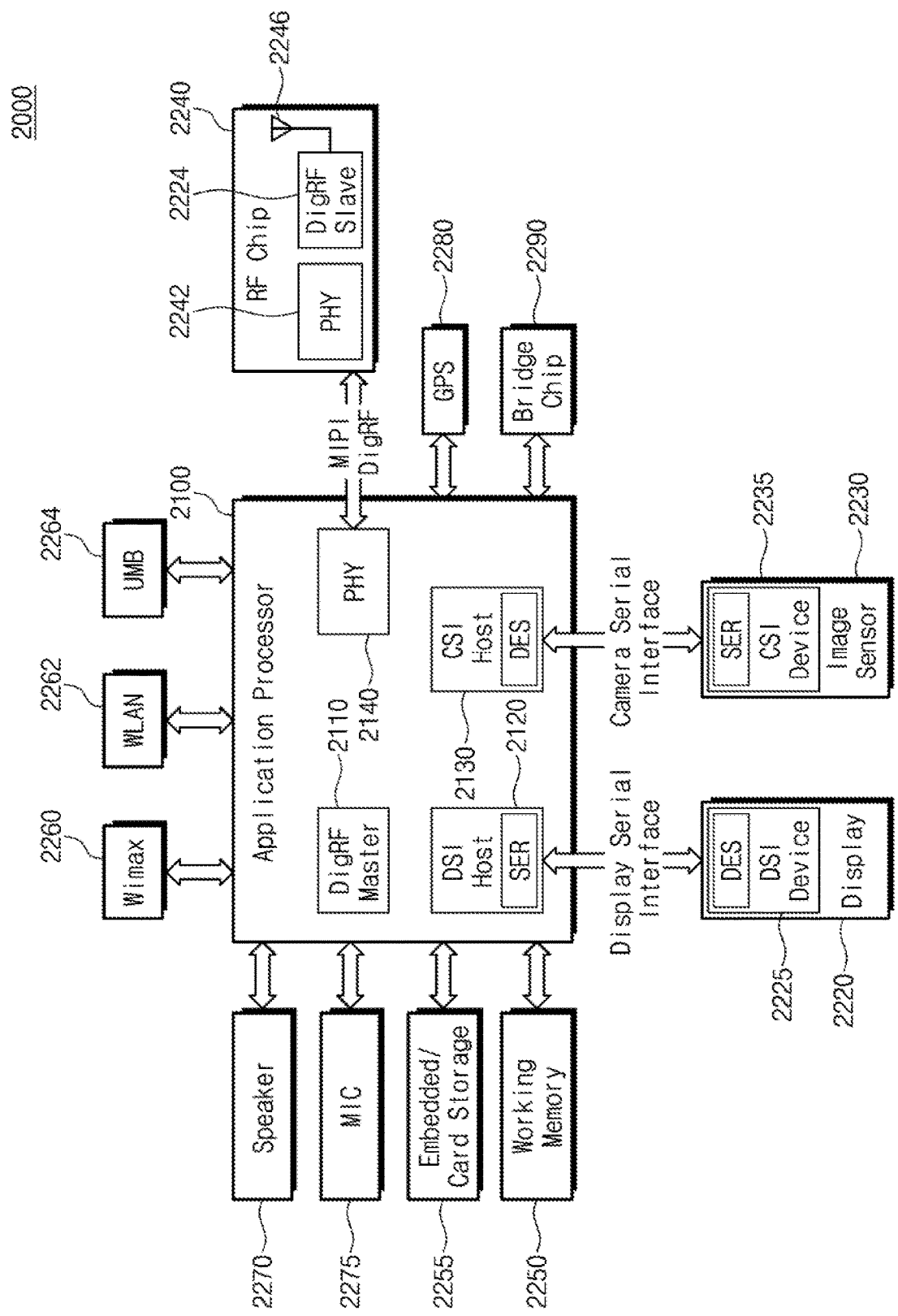
FIG. 16 is a block diagram illustrating a configuration of an electronic system including a dynamic sensor according to an embodiment of the inventive concept and interfaces thereof.

FIG. 16 is a block diagram illustrating a configuration of an electronic system including a dynamic sensor according to an embodiment of the inventive concept and interfaces thereof. An electronic system 2000 may be implemented with a data processing device capable of using or supporting an interface suggested by mobile industry processor interface (MIPI) alliance. For example, the electronic system 2000 may be implemented with one of electronic devices, such as a digital camera, a video camcorder, a smartphone, a tablet, and a wearable device (e.g., a smart watch or a smart band).

The electronic system 2000 may include an application processor 2100, a display 2220, and an image sensor 2230. The application processor 2100 may include a DigRF master 2110, a display serial interface (DSI) host 2120, a camera serial interface (CSI) host 2130, and a physical layer 2140.

The DSI host 2120 may communicate with a DSI device 2225 of the display 2220 in compliance with the DSI. For example, an optical serializer SER may be implemented in the DSI host 2120. For example, an optical deserializer DES may be implemented in the DSI device 2225.

The CSI host 2130 may communicate with a CSI device 2235 of the image sensor 2230 through a CSI. For example, an optical deserializer DES may be implemented in the CSI host 2130. For example, an optical serializer SER may be implemented in the CSI device 2235.

The image sensor 2230 may receive a light from the outside. The image sensor 2230 may output a voltage, based on the quantity of received light. The image sensor 2230 may perform digital conversion on the voltage to generate a digital signal. The application processor 2100 may process the digital signal to display an image in the display 2220. The image sensor 2230 may perform binning on the voltage. Accordingly, the size of data included in the digital signal may decrease.

The electronic system 2000 may further include a radio frequency (RF) chip 2240 that communicates with the application processor 2100. The RF chip 2240 may include a physical layer 2242, a DigRF slave 2244, and an antenna 2246. For example, the physical layer 2242 of the RF chip 2240 and the physical layer 2140 of the application processor 2100 may exchange data with each other through a DigRF interface suggested by the MIPI alliance.

The electronic system 2000 may further include a working memory 2250 and embedded/card storage 2255. The working memory 2250 and the embedded/card storage 2255 may store data provided from the application processor 2100. In addition, the working memory 2250 and the embedded/card storage 2255 may provide the data stored therein to the application processor 2100. For example, the working memory 2250 and/or the embedded/card storage 2255 may store image data.

The working memory 2250 may temporarily store data processed or to be processed by the application processor 2100. The working memory 2250 may include a volatile memory such as a static random access memory (SRAM), a dynamic RAM (DRAM), or a synchronous DRAM (SDRAM) and/or a nonvolatile memory such as a flash memory, a phase-change RAM (PRAM), a magneto-resistive RAM (MRAM), a resistive RAM (ReRAM), or a ferro-electric RAM (FRAM).

The embedded/card storage 2255 may store data regardless of whether a power is supplied. The embedded/card storage 2255 may include one or more nonvolatile memories, a memory controller, and a buffer. For example, the embedded/card storage 2255 may include at least one of nonvolatile memories such as a flash memory, a PRAM, an MRAM, a ReRAM, and an FRAM. For example, the embedded/card storage 2255 may be devices such as a secure digital (SD) card and an embedded multimedia card (eMMC).

The electronic system 2000 may communicate with an external system through a communication module such as a worldwide interoperability for microwave access (WiMAX) 2260, a wireless local area network (WLAN) 2262, and an ultra-wideband (UWB) 2264. Even though the WiMAX 2260, the WLAN 2262 and the UWB 2264 are mentioned to help understand, the electronic system 2000 may further include various communication modules. The communication modules of the electronic system 2000 may transmit/receive an information signal and an image signal according to an embodiment of the inventive concept.

The electronic system 2000 may further include a speaker 2270 and a microphone 2275 to process voice information. The electronic system 2000 may further include a global positioning system (GPS) device 2280 to process position information. The electronic system 2000 may further include a bridge chip 2290 to manage connections between peripheral devices.

Circuits, chips, and devices according to an embodiment of the inventive concept may be mounted using various kinds of semiconductor packages. For example, circuits, chips, and devices according to an embodiment of the inventive concept may be mounted using a package: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

An image sensor of the inventive concept may be of a tetracell structure in which pixels using the same color filter are continuously arranged. Also, the image sensor may perform diamond binning to process image data. Accordingly, an electronic device including the image sensor of the inventive concept may provide a bright image under a low-level light. Also, the electronic device may prevent the image quality from decreasing under the low-level light.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An image sensor comprising:
a pixel array including pixel sets arranged in a row direction and a column direction, and configured to output a first signal generated from a first pixel set of the pixel sets, to output a second signal generated from a second pixel set of the pixel sets, output a third signal generated from a third pixel set of the pixel sets, and output a fourth signal generated from a fourth pixel set of the pixel sets; and
a converting circuit configured to generate a first binning signal by a first analog binning of the first signal from the first pixel set and the second signal from the second pixel set and a second binning signal by a second analog binning of the third signal from the third pixel set and the fourth signal from the fourth pixel set, to perform a digital conversion on the first binning signal and the second binning signal to generate a first digital signal and a second digital signal, and to perform digital binning on the first digital signal and the second digital signal to generate a third digital signal,
wherein each of the first to fourth pixel sets includes pixels adjacent to each other, and
wherein the first pixel set and the second pixel set are located at different rows and different columns from each other.

2. The image sensor of claim 1, wherein the pixels adjacent to each other include pixels of a first color, and
wherein the first binning signal includes information about the first color.

3. The image sensor of claim 2, wherein the first color is green.

4. The image sensor of claim 2, wherein a first row and a second row of the pixel array are successively arranged in the column direction;
the pixel sets including the pixels of the first color and the pixel sets including pixels of a second color are alternately arranged in the first row; and
the pixel sets including the pixels of the first color and pixel sets including pixels of a third color are alternately arranged in the second row, and
wherein the first color, the second color, and the third color are different colors.

5. The image sensor of claim 1, wherein a group of the first to fourth pixel sets are arranged in a first diamond pattern occupying three columns and three rows or a second diamond pattern occupying two rows and two columns.

6. The image sensor of claim 1, wherein each of the third pixel set and the fourth pixel set includes pixels of a first color adjacent to each other, and
wherein the first color is blue or red.

7. An image sensor comprising:
a pixel array configured to output a first signal generated from a first pixel set and a second signal generated from a second pixel set located in a first diagonal direction from the first pixel set; and
a converting circuit configured to perform a first analog binning on the first signal and the second signal to generate a first binning signal, and to perform digital conversion based on the first binning signal,
wherein the first pixel set includes a plurality of first pixels adjacent to each other and the second pixel set includes a plurality of second pixels adjacent to each other
wherein the converting circuit performs a second analog binning based on a third signal output from a third pixel set and a fourth signal output from a fourth pixel set located in a second diagonal direction from the third pixel set, to generate a second binning signal,
wherein the third pixel set and the fourth pixel set includes a plurality of third pixels adjacent to each other and a plurality of fourth pixels adjacent to each other, respectively, and
wherein the converting circuit performs the digital conversion on the first binning signal and the second binning signal to generate a first digital signal and a second digital signal, and performs digital binning on the first digital signal and the second digital signal to generate a third digital signal.

8. The image sensor of claim 7, wherein the converting circuit performs the first analog binning such that a voltage level of the first binning signal is smaller than a sum of a voltage level of the first signal and a voltage level of the second signal.

9. The image sensor of claim 7, wherein the pixel array outputs the first signal and the second signal to the converting circuit through a first output line and outputs the third signal and the fourth signal to the converting circuit through a second output line.

10. The image sensor of claim 7, wherein the converting circuit performs the digital binning such that a size of data included in the third digital signal is smaller than a sum of a size of data included in the first digital signal and a size of data included in the second digital signal.

11. An image sensor comprising:
a pixel array configured to output signals generated from pixel sets each including pixels adjacent to each other, for generating a first digital signal; and
a converting circuit configured to perform binning and digital conversion on the signals to generate the first digital signal,
wherein the pixel sets include a first pixel set, a second pixel set, and a third pixel set,
wherein, when the second pixel set and the third pixel set are two pixel sets which are closest to the first pixel set from among the pixel sets, and rows and a column at which the second pixel set and the third pixel set are located are different from a row and a column at which the first pixel set is located, and
wherein the converting circuit is configured to:
perform the binning on a first plurality of signals among the signals to generate a first binning signal;
perform the binning on a second plurality of signals among remaining signals of the signals other than the first plurality of signals to generate a second binning signal; and
perform the digital conversion on the first binning signal and the second binning signal.

12. The image sensor of claim 11, wherein the first digital signal includes information about a position corresponding to a center of gravity of an area which is defined by connecting the pixel sets.

13. The image sensor of claim 11, wherein an area which is defined by connecting the pixel sets is a diamond.

14. The image sensor of claim 11, wherein the first pixel set includes pixels of a same color which are arranged in an M*N matrix (M and N being an integer of 2 or more), and
wherein the M*N matrix is a matrix in which "M" pixel lines each including "N" pixels continuously arranged in a first direction are arranged in a second direction different from the first direction.

15. The image sensor of claim 11, wherein the converting circuit generates a second digital signal and a third digital signal by the digital conversion on the first binning signal and the second binning signal, and performs the binning on the second digital signals and the third digital signal to generate the first digital signal.

16. The image sensor of claim 11, wherein the pixel array outputs the signals to the converting circuit through different output lines.

* * * * *